(12) United States Patent
Parrish

(10) Patent No.: US 7,862,352 B2
(45) Date of Patent: Jan. 4, 2011

(54) STACKABLE ELECTRICAL PANEL MODULES

(75) Inventor: Joseph Edward Parrish, Goldsboro, NC (US)

(73) Assignee: Cooper Technologies Company, Houston, TX (US)

( * ) Notice: Subject to any disclaimer, the term of this patent is extended or adjusted under 35 U.S.C. 154(b) by 27 days.

(21) Appl. No.: 12/197,036

(22) Filed: Aug. 22, 2008

(65) Prior Publication Data

US 2010/0048047 A1 Feb. 25, 2010

(51) Int. Cl.
*H01R 13/44* (2006.01)

(52) U.S. Cl. .................... 439/142; 439/133; 439/924.1; 439/541.5

(58) Field of Classification Search ............... 439/924.1, 439/924.2, 142, 133, 131, 541.5
See application file for complete search history.

(56) References Cited

U.S. PATENT DOCUMENTS

| | | | | |
|---|---|---|---|---|
| 4,767,347 A | * | 8/1988 | Kamp et al. | 439/133 |
| 4,845,593 A | * | 7/1989 | Brown et al. | 439/924.2 |
| 4,955,821 A | * | 9/1990 | Bernardini | 439/142 |
| 5,017,147 A | * | 5/1991 | Sugiyama et al. | 439/144 |
| 5,571,023 A | * | 11/1996 | Anthony | 439/142 |
| 5,600,108 A | * | 2/1997 | Newham | 439/924.1 |
| 6,796,814 B1 | * | 9/2004 | Handschke | 439/142 |

* cited by examiner

*Primary Examiner*—Briggitte R Hammond
(74) *Attorney, Agent, or Firm*—King & Spalding LLP

(57) ABSTRACT

An electrical panel assembly comprised of individual electrical panel modules. The electrical panel modules comprise a first receptacle comprising transmitting electrical contacts to interface with a first connector comprising receiving electrical contacts and a first rotation ring for facilitating contact between the transmitting electrical contacts and the receiving electrical contacts, where the first rotation ring rotates between an open position permitting connection or disconnection of the first connector from the receptacle and a closed position preventing connection or disconnection of the first connector from the first receptacle. The first electrical panel module interacts with a second electrical panel module in a manner that the absence of the first connector in the first receptacle prevents the second electrical panel module from accepting a second connector.

33 Claims, 25 Drawing Sheets

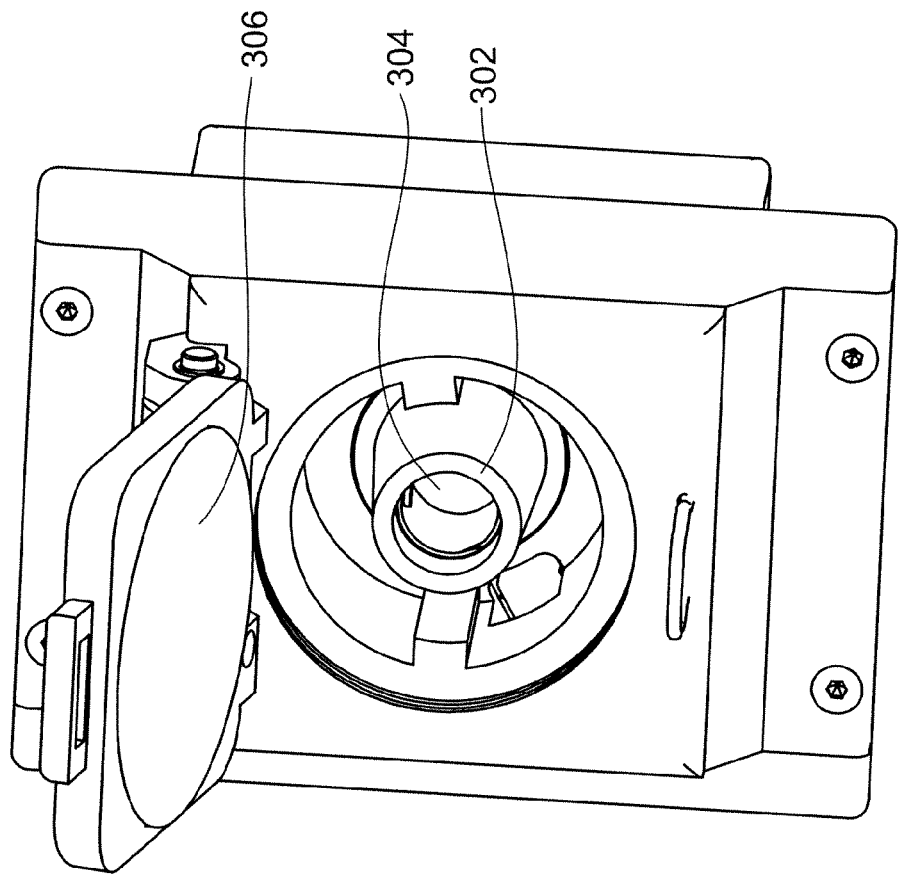
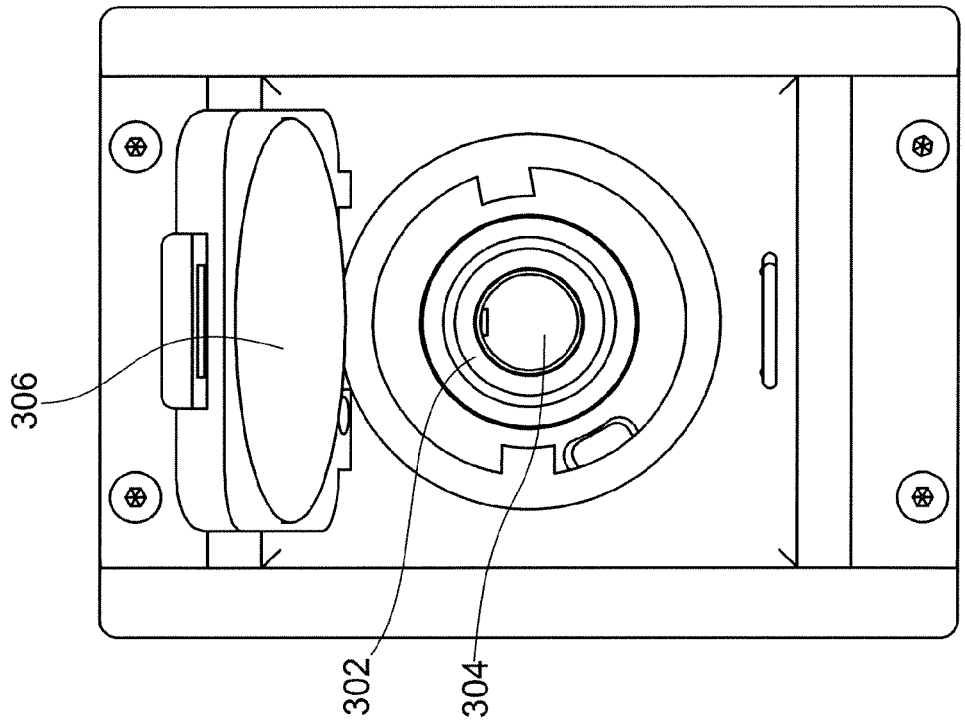
FIG. 3B
FIG. 3A

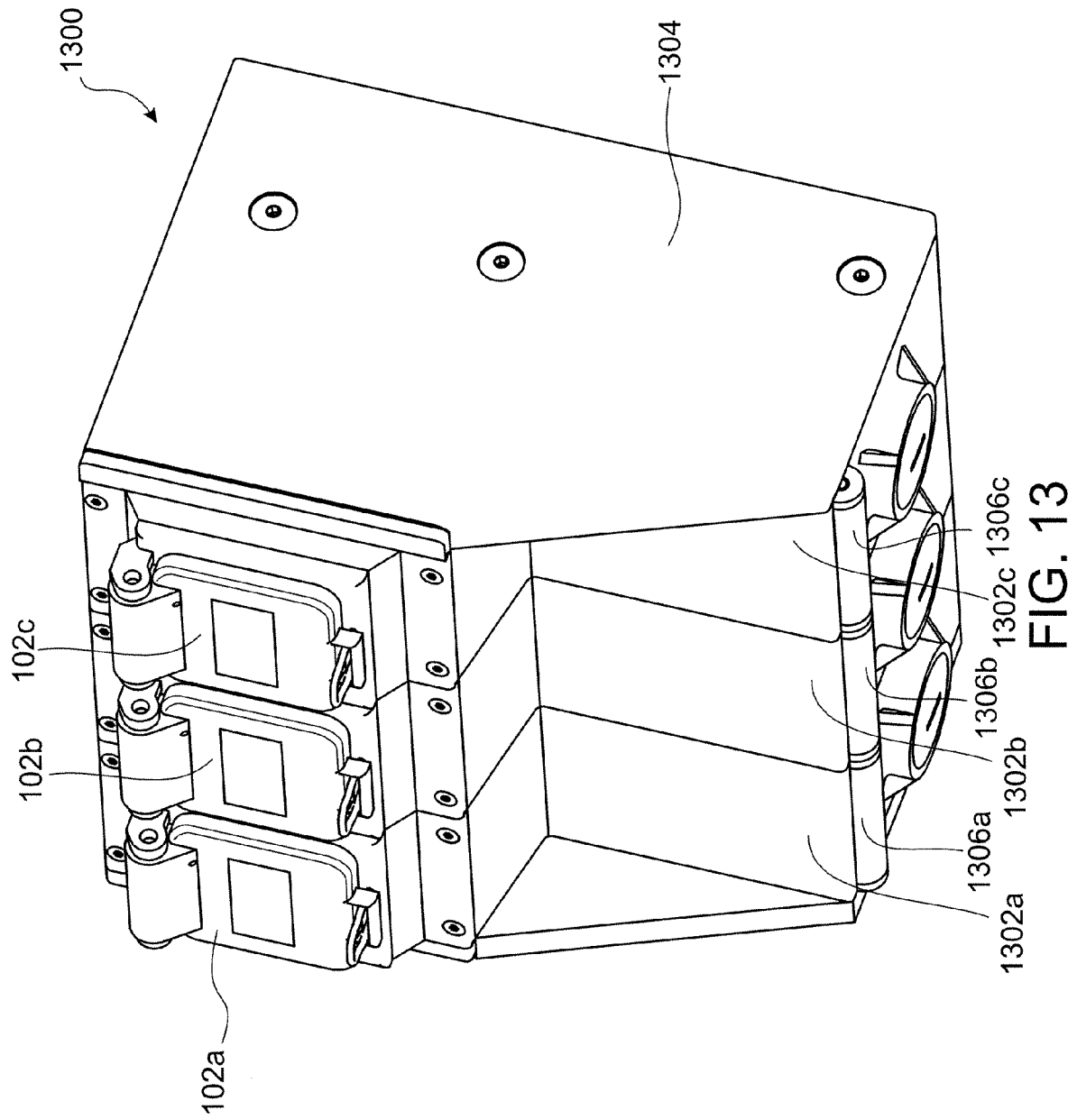

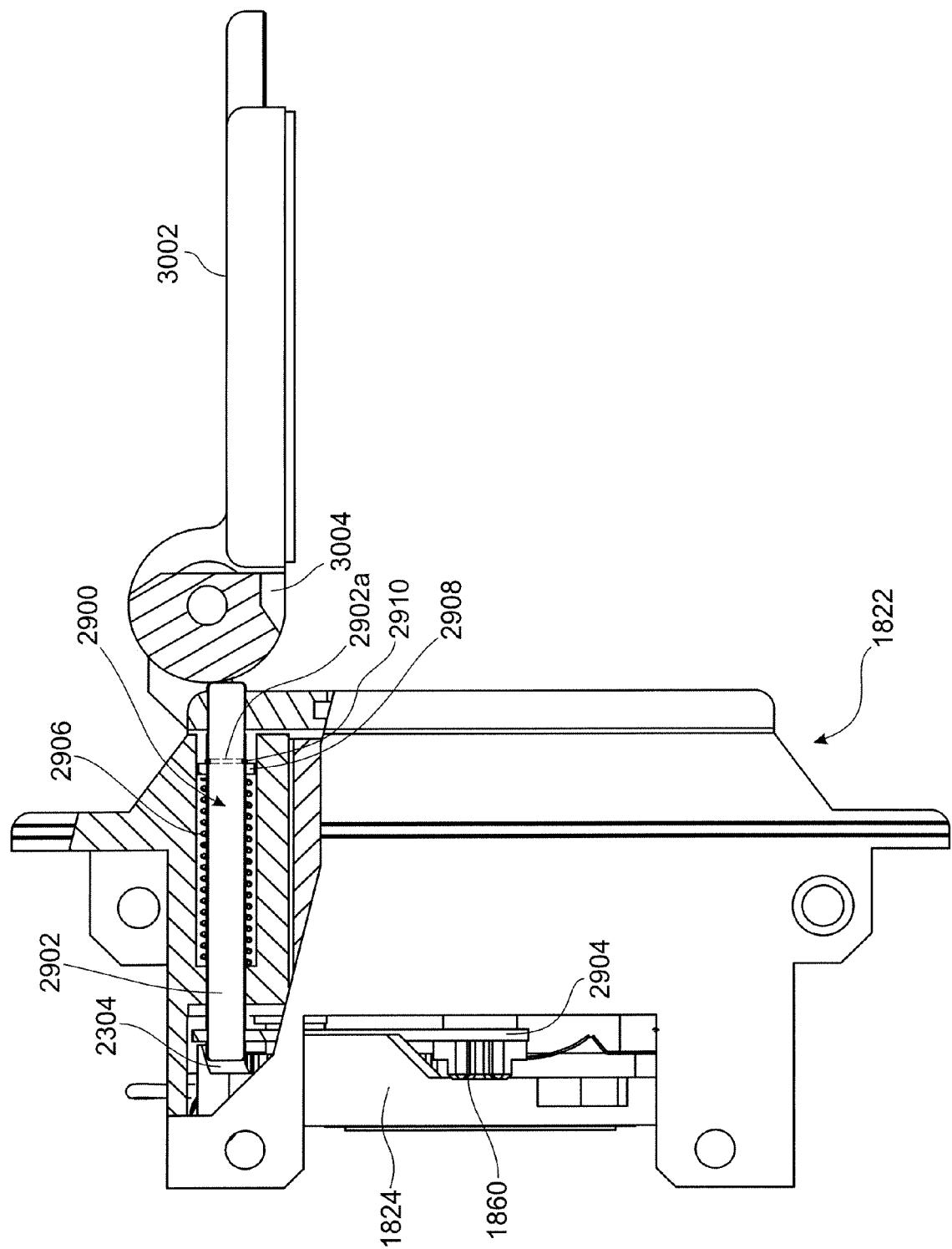

STACKABLE ELECTRICAL PANEL MODULES

CROSS REFERENCE TO RELATED APPLICATIONS

This application is related to U.S. patent application Ser. No. 12/196,995 entitled Stackable Electrical Panel Modules and filed Aug. 22, 2008. The entire disclosure of the above-identified related application is hereby fully incorporated herein by reference.

TECHNICAL FIELD

The disclosed apparatus relates generally to electrical panels to connect electrical devices to power sources. Specifically, this application relates to technology that allows users to create an electrical panel from component modules to meet individual requirements.

BACKGROUND

To protect equipment and personnel when working with single conductor connectors, electrical connectors are attached and removed from electrical panels in a particular order. For example, where a ground connector is used, the ground connector is connected first and disconnected last. Typical electrical panel assemblies include three receptacles (comprising a ground, a neutral, and a live receptacle) or five receptacles (comprising a ground, neutral, and three separate live receptacles). Previous electrical panel assemblies have been limited by the number of receptacles the manufacturer decides to place in an electrical panel assembly. Due to the power requirements of some applications, previous electrical panel assemblies might not fit into one of these preexisting categories.

One conventional solution uses an electrical panel assembly with more than the needed number of receptacles where the unused receptacles are sealed or otherwise made non-functional. Another conventional solution requires a manufacturer to make an electrical panel assembly to the user's unique specifications, which could be both expensive and time consuming.

Therefore, a need exists for an electrical panel assembly that fits the individual needs of the user without customization or alteration of an existing electrical panel assembly.

SUMMARY

The disclosed apparatus relates generally to electrical panel assemblies. More particularly, the disclosed apparatus relates to a modular apparatus having individual modules that may be interconnected to form an electrical panel assembly. The assembly can maintain standards of electrical safety while allowing previously unavailable flexibility. The disclosed apparatus forces electrical connectors to be attached and detached from an electrical panel assembly in a particular order. The electrical panel assembly also may prevent a protective cover over the next receptacle module from being opened before a connector is installed in a preceding module.

The electrical panel assembly invention can require the connectors to be attached to and detached from their respective receptacles in a given order. The electrical panel assembly can serve either as an input panel or as an output panel and can be used in electrical systems requiring multiple receptacles.

According to one exemplary aspect, an electrical panel assembly comprises a first electrical panel module comprising a first receptacle contained in the module to interface with a first connector. The first receptacle comprises a first rotation ring for the interface between the receptacle and the first connector. The first rotation ring moves between an open position and a closed position. The open position permits connection or disconnection of the first connector from the first receptacle. The closed position prevents connection or disconnection of the first connector from the first receptacle. The first electrical panel module interacts with a second electrical panel module in a manner that, absent connection of the first connector in the first receptacle, the ability of a second electrical panel module receptacle contained in the second electrical panel module can be prevented from connecting to a second connector.

According to another exemplary aspect, an electrical panel module is designed to link with a subsequent electrical panel module in series. The electrical panel module comprises a receptacle to interface with a connector. A rotation ring is provided for an interface between the receptacle and the connector. The rotation ring moves between an open position that permits connection or disconnection of the connector from the receptacle and a closed position that prevents connection or disconnection of the connector from the receptacle. A tab interlock interfaces with a subsequent electrical panel module in series.

The disclosed apparatus can provide a module that can connect with other modules to form an electrical panel assembly. Each module comprises a receptacle that can accept a connector. Each module comprises various safety mechanisms that prevent improper use once the modules are assembled as an electrical panel assembly. Aspects of the disclosed apparatus include a mechanism that may prevent a receptacle from accepting a connector unless the previous module in series has a connector in its receptacle. This feature may prevent removal of a connector from a module until the subsequent module in sequence has already had a connector removed. This feature enforces the safety requirement that ground connections should be made first and disconnected last. Another aspect includes a lock that may prevent a protective cover from opening to expose the receptacle until the receptacle of the previous module has a connector inserted therein.

According to another exemplary aspect, an electrical panel assembly comprises a first electrical panel module comprising a first receptacle to interface with a first connector. A first rotation ring facilitates contact between the first receptacle and the first connector. The first rotation ring rotates in open position which permits connection or disconnection of the first connector from the receptacle. When the rotation ring is in a closed position, the first connector may not be connected or disconnected from the first receptacle. The first electrical panel module interacts with a second electrical panel module in a manner such that the absence of the first connector in the first receptacle prevents the second electrical panel module from accepting a second connector.

According to another aspect of an exemplary embodiment, an electrical panel module comprises a module casing that provides a housing for the electrical panel module and is designed to link with a subsequent electrical panel modules in series. The module casing further comprises a receptacle to interface with a connector and a rotation ring for facilitating contact between the receptacle and the connector, where the rotation ring moves between an open position permitting connection or disconnection of the connector from the receptacle and a closed position preventing connection or disconnection of the connector from the receptacle. A tab interlock is operably coupled to interface with the rotation ring and interfaces with a subsequent electrical panel module. Each module casing comprises one or more openings to facilitate internal interconnectivity with a subsequent electrical power module via the tab interlock.

These and other aspects, objects, features, and embodiments of the present disclosure will become apparent to those skilled in the art upon consideration of the following detailed description of illustrated embodiments exemplifying the best mode for carrying out the apparatus as presently perceived.

BRIEF DESCRIPTION OF THE DRAWINGS

The present apparatus may be better understood by reading the following description of non-limitative, exemplary embodiments with reference to the attached drawings, wherein like parts of each of the figures are identified by the same reference character, and which are briefly described as follows.

FIG. 3A is an front elevation view of an individual electrical panel module with a cover opened to reveal a receptacle according to an exemplary embodiment.

FIG. 3B is a perspective view of the individual electrical panel module of FIG. 3A.

FIG. 8A is a rear perspective of an electrical panel model showing the cover interlock aperture according to an exemplary embodiment.

FIG. 8B is a rear perspective view of an electrical panel module showing a tab interlock aperture according to an exemplary embodiment.

FIG. 8C is a perspective view of a series of elements of an electrical panel model according to an exemplary embodiment.

FIG. 13 is a perspective view of an assembly having individual electrical panel modules integrated with stackable electrical panels to form a stackable electrical panel assembly according to an exemplary embodiment.

FIG. 31 is a side perspective view of a cam electrical panel module with a modified cover in an open position according to an exemplary embodiment.

DETAILED DESCRIPTION OF THE INVENTION

Figure 1:
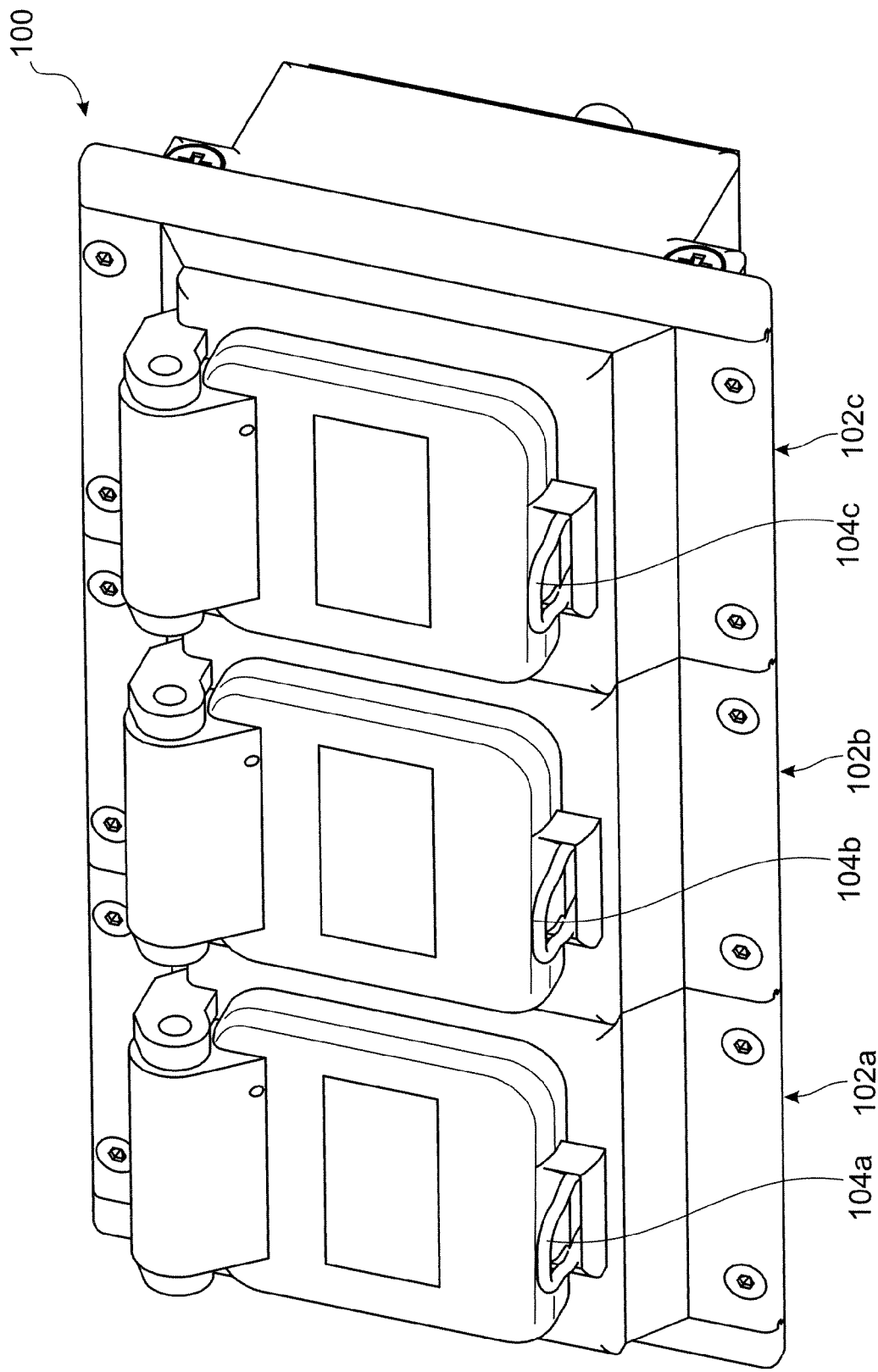
FIG. 1 is a perspective view of a fully assembled electrical panel assembly comprising three electrical panel modules according to an exemplary embodiment.

The disclosed apparatus may be better understood by reading the following description of non-limiting embodiments with reference to the attached drawings, wherein like parts in each of the figures are identified by the same reference characters.

FIG. 1 is a perspective view of a fully assembled electrical panel assembly 100 comprising three electrical panel modules 102a-c according to an exemplary embodiment. Alternative embodiments may have an unlimited number (two or more) of electrical panel modules 102 connected to each other, as will be explained below.

Each electrical panel module 102 has multiple moving parts. For illustrative purposes, all elements that shift position have a first position and a second position. The first position occurs when the respective element has not been acted on. The second position occurs when the element has been acted on. In several figures, the associated views are from the rear of the modules. As a result, while numbering typically runs from left to right, the numbering of modules in those figures viewed from the rear perspective will be from right to left to account for the perspective of the figures.

Figure 2:
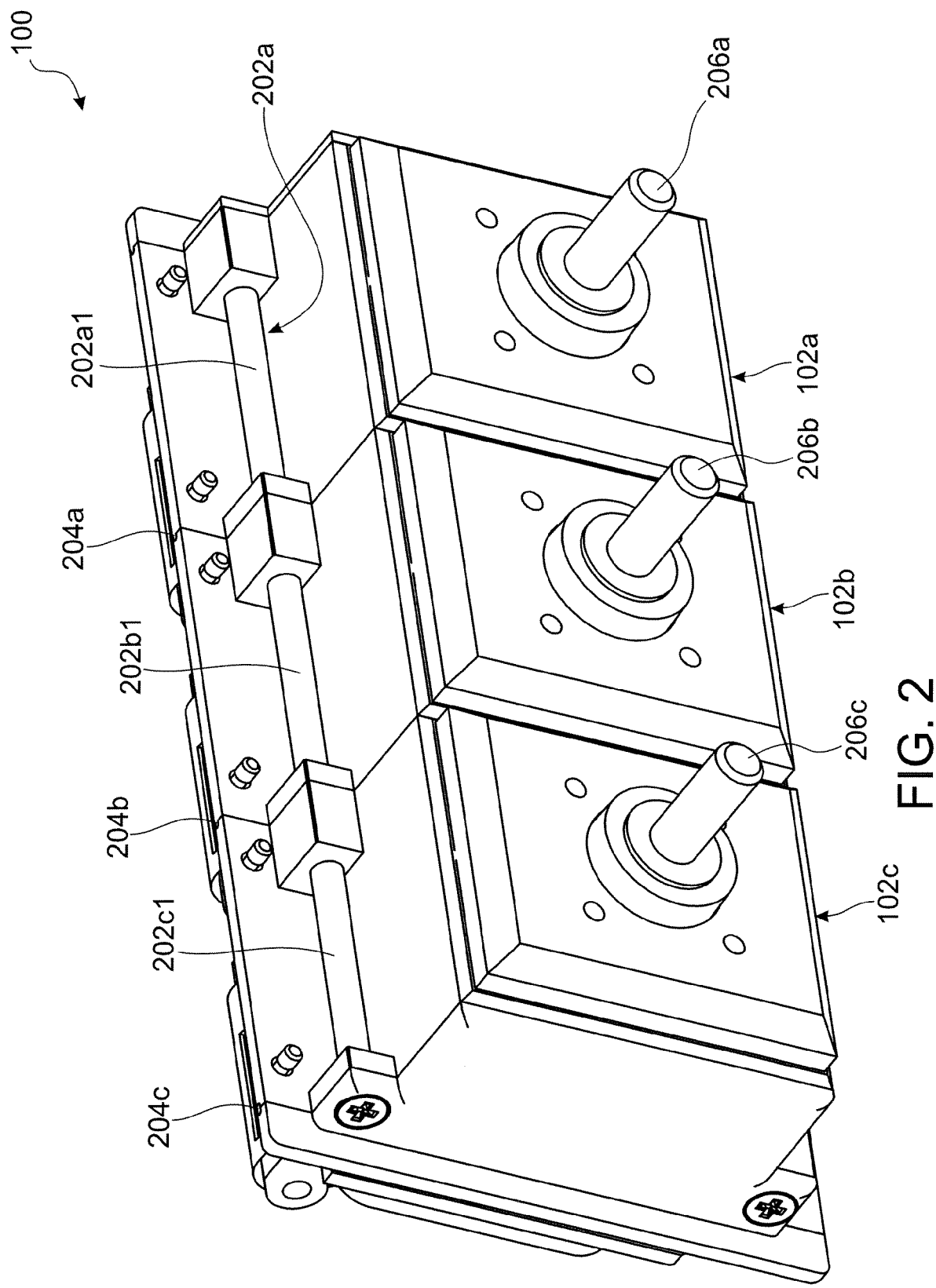
FIG. 2 is a rear perspective view of the electrical panel assembly of FIG. 1.
Figure 4:
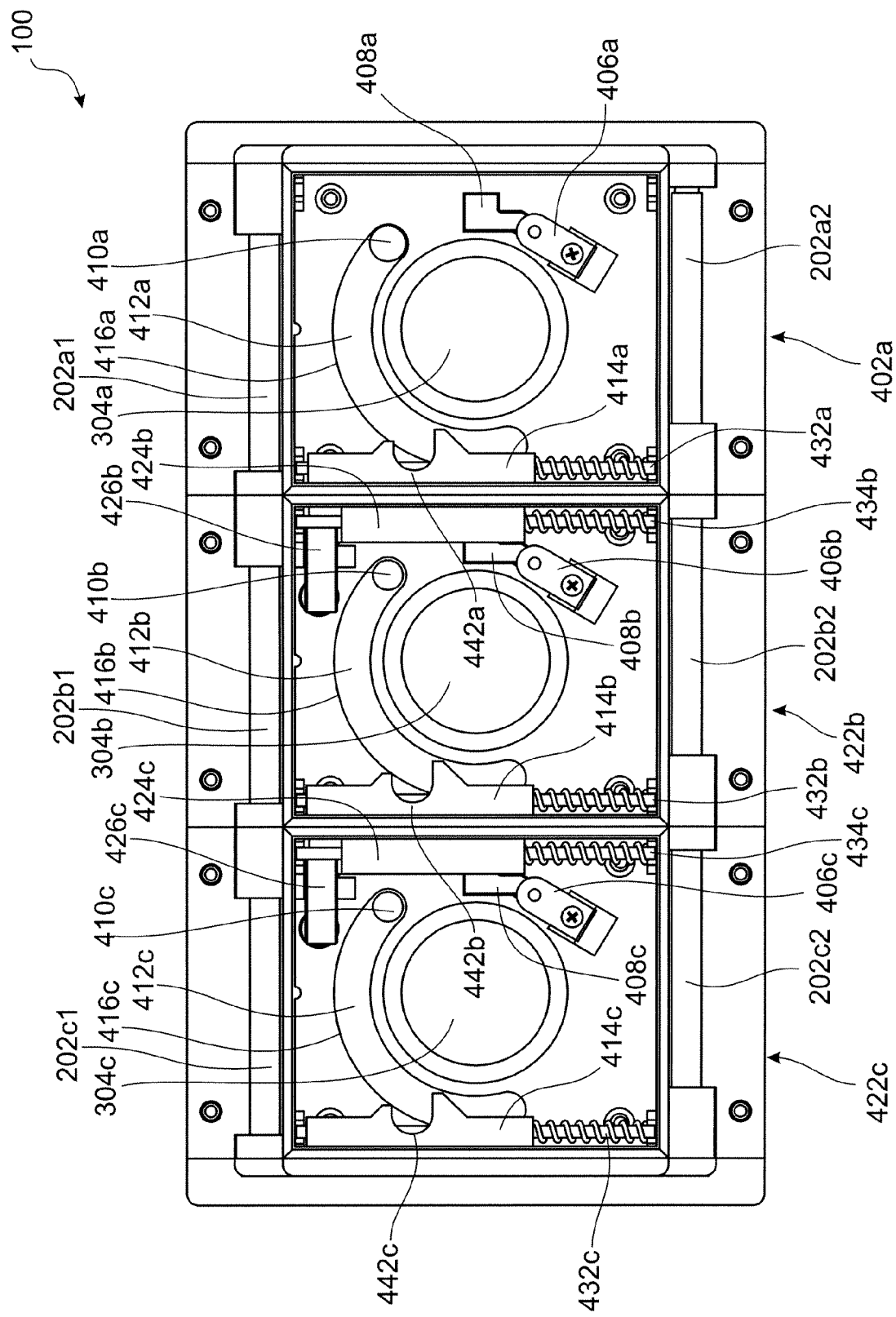
FIG. 4 is a rear internal view of the electrical panel assembly of FIG. 1, illustrating the interconnectivity of one ground electrical panel module and two non-ground electrical panel modules according to an exemplary embodiment.

FIG. 2 is a perspective view of the rear of the fully assembled, exemplary electrical panel assembly 100 from FIG. 1. Structural connections between the electrical panel modules 102a-c in the exemplary embodiment are strengthened by use of stackable metallic joining rods 202a1-c1 and 202a2-c2 as shown in FIG. 2, wherein the stackable metallic joining rods 202a2-c2 on the underside are obscured in FIG. 2. Stackable metallic joining rods 202a2-c2 are illustrated in FIG. 4. These stackable metallic joining rods 202a1-c1 and 202a2-c2 interconnect and strengthen the bond between the electrical panel modules 102a-c by fixing and aligning the electrical panel modules 102a-c to each other. The electrical panel modules 102a-c each hold a section of the connector rod 202a1-c1 and 202a2-c2. The connector rod 202a1 comprises a female threaded portion that is adjacent to a male threaded portion of connector rod 202b1. The connector rods 202a1 and 202b1 are coupled together to form a single rod holding the modules 102a and 102b together. This process is continued with connector rod 202b1 and 202c1 and also for connector rods 202a2-c2. An additional feature that aids in integrating the electrical panel modules 102a-c are the tongue and groove seals 204a-c that aid in the integrity of the electrical panel modules 102a-c. Electrical terminals 206a-c project from the rear of the modules 102a-c to allow the electrical panel modules 102a-c to be electrically coupled to a power source (not shown).

FIG. 3A is an front elevation view of an individual electrical panel module 102 with a cover 306 opened to reveal a receptacle 302 according to an exemplary embodiment. FIG. 3B is a perspective view of the exemplary electrical panel module 102 illustrated in FIG. 3A. FIGS. 3A-3B illustrate how the cover 306 conceals the receptacle 302, which comprises an aperture 304 for a connector (not shown) to be installed. The cover 306 in FIG. 3A is in an open position allowing access to the receptacle 302. As will be described below, the connector couples to the receptacle 302, thereby creating a secure connection.

In an exemplary embodiment, the connectors are dimensioned to fit within the apertures 304 of the electrical panel modules 100 and comprise receiving electrical contacts that are sized to interface with transmitting electrical contacts in the electrical panel modules 102a-c when installed by rotating the connectors into second position. With a connector installed in a receptacle 302, the individual elements of the electrical panel module 102 are manipulated, as described hereinafter. Although referred to herein as receiving electrical contacts of the connector and transmitting electrical contacts of the module 102, the transmitting and receiving functions of those items can be reversed without departing from the scope and spirit of the present invention.

Figure 5:
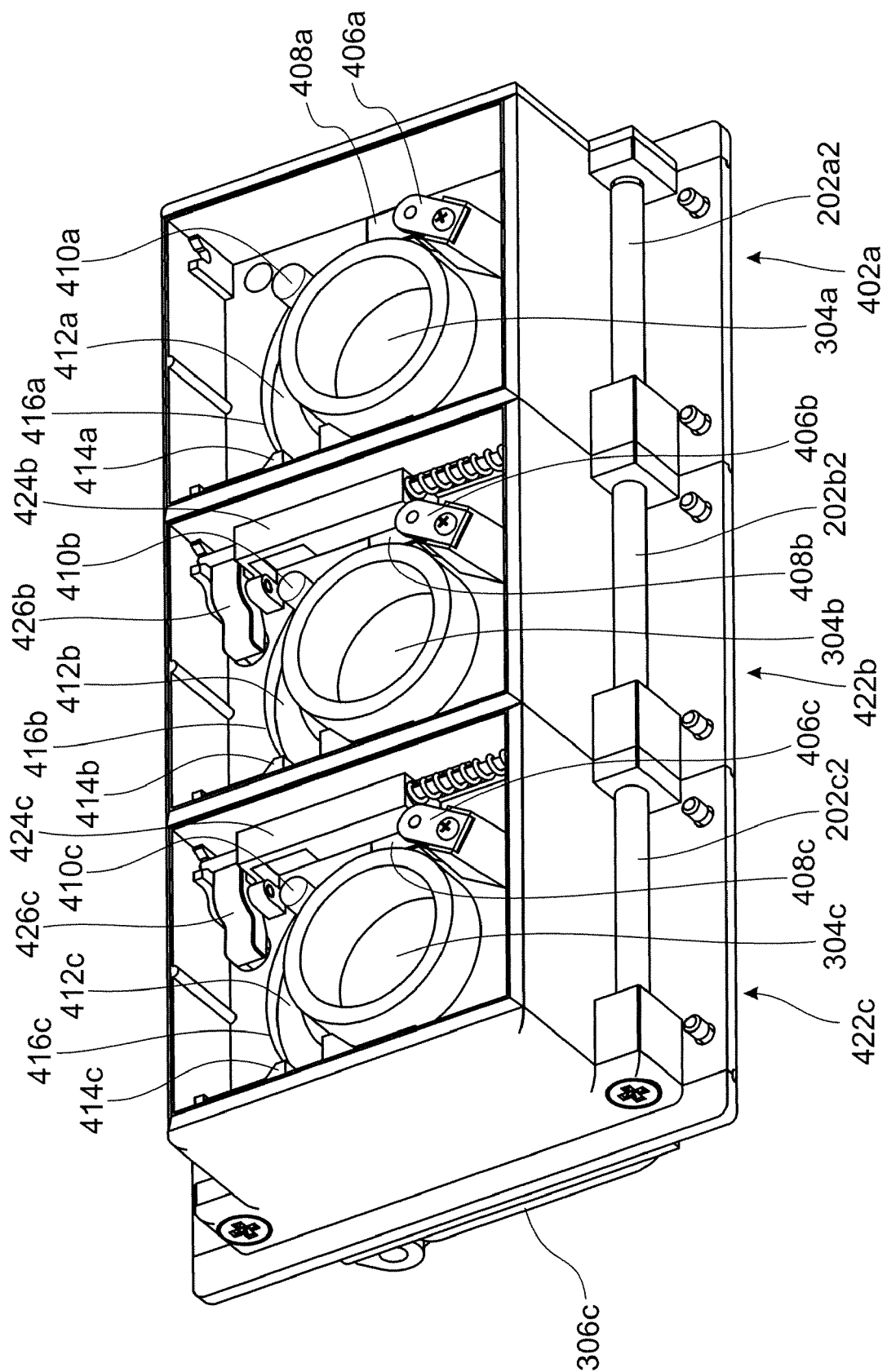
FIG. 5 is a perspective, internal view of the assembly of FIG. 4.

FIG. 4 is a rear internal view of the electrical panel assembly 100 of FIG. 1, illustrating the interconnectivity of one ground electrical panel module 402a and two non-ground electrical panel modules 422b-c according to an exemplary embodiment. FIG. 5 is a perspective view of the assembly 100 from FIG. 4. Elements will be referred to from right to left due to the view being from the rear perspective. Referring to FIGS. 1 and 4, the rear view of ground module 402a corresponds to module 102a, the rear view of non-ground module 422b corresponds to module 102b, and the rear view of non-ground module 422c corresponds to module 102c. The ground electrical panel module 402a, and its components referenced in FIGS. 4-5, will be described hereinafter with reference to FIGS. 6, 8, and 9. The non-ground electrical panel modules 422b-c, and their components referenced in FIGS. 4-5, will be described hereinafter with reference to FIG. 7-9.

Figure 6:
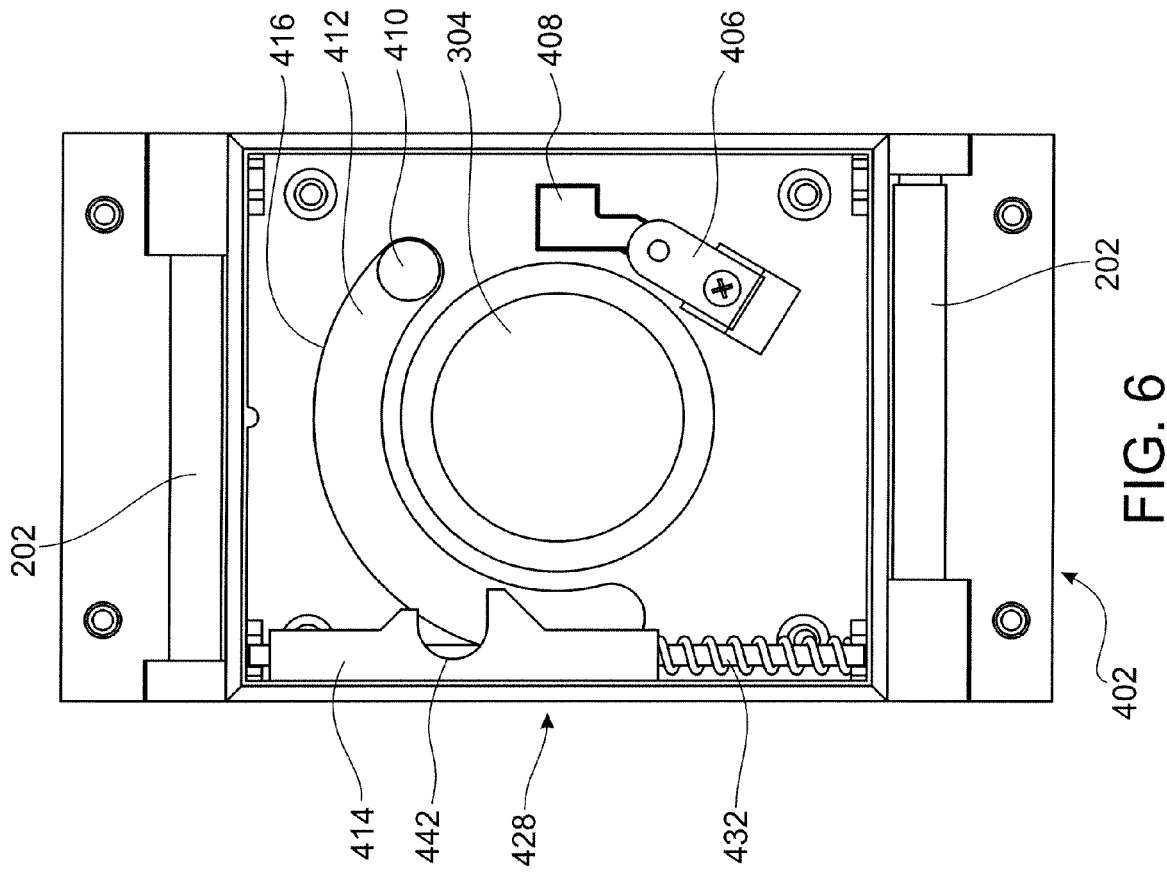
FIG. 6 is a rear elevation view of an electrical panel module configured for use as a ground electrical panel module according to an exemplary embodiment.

FIG. 6 is a rear elevation view of an electrical panel module 102 configured for use as a ground electrical panel module according to an exemplary embodiment. The ground electrical panel module 402 comprises an aperture 304. Surrounding the aperture 304 is a rotation ring 412 having a rotation ring tab 410 and being disposed in a rotation channel 416, where the rotation ring tab 410 interfaces with a tab interlock 414. A plug rotate lock 408a fixes the rotation ring 412 in a first position until an electrical connector (not shown) is installed in the aperture 304. A plug rotate lock spring 406 biases the plug rotate lock 408 in the first position when a connector is not inserted. The tab interlock 414 stays in the first position (as illustrated) when a connector is not installed due to the bias force of an attached interlock spring 432 until acted upon by the rotation ring tab 410.

As illustrated in FIGS. 3A and 3B, the ground electrical panel module 402 includes a cover 306 that obstructs entry into the aperture 304 as shown in FIG. 3a. In an exemplary embodiment, the ground electrical panel module 402 allows the cover 306 to open without restrictions. Alternatives will be explained below.

The insertion of the connector into the aperture 304 acts on the plug rotate lock 408 by applying a lateral force on the plug rotate lock 408 that overcomes the force of the plug rotate lock spring 406. The insertion of the connector into the aperture 304 moves the plug rotate lock 408 out of the first position to the second position. When the plug rotate lock 408 moves into the second position, the rotation ring 412 surrounding the aperture 304 is free to rotate about the aperture 304. In an exemplary embodiment, a spring can hold the rotation ring 412 in a first position until the connector placed in the aperture 304 is rotated to force the rotation ring 412 to rotate. The user turns the inserted connector in the freed rotation ring 412 until the rotation ring 412 reaches a second position corresponding to an opposite end of the rotation channel 416.

In an exemplary embodiment, the rotation ring 412 can operate in parallel with a cam lock (not shown) that secures the connector to the receptacle 302 and holds the transmitting electrical contact of the elemental panel module 402 to interact with the receiving electrical contact of the connectors. The receptacle 302 comprises a rivet (not shown) that interacts with the connector by way of a cam cut into the connector. As the connector is inserted into the receptacle 302 and rotated, the rivet interacts with the cam in the connector and couples the connector to the receptacle 302. This rotation will continue until the connector is fixed in a position allowing electrical coupling. Additionally, the action of the cam locking causes the receiving electrical contacts of the connector to expand inside the receptacle 302. The coupling of the transmitting and receiving electrical connectors allows power to flow from the electrical panel modules 402 to a device coupled to the connector. In an exemplary embodiment, the cam locks are designed to engage when the rotation ring 412 completes rotating, which is approximately 180 degrees. In an exemplary embodiment, the connectors are designed to have the receiving contacts of the connectors electrically couple with the transmitting contacts of the electrical panel module at or before rotation completes.

Figure 8:
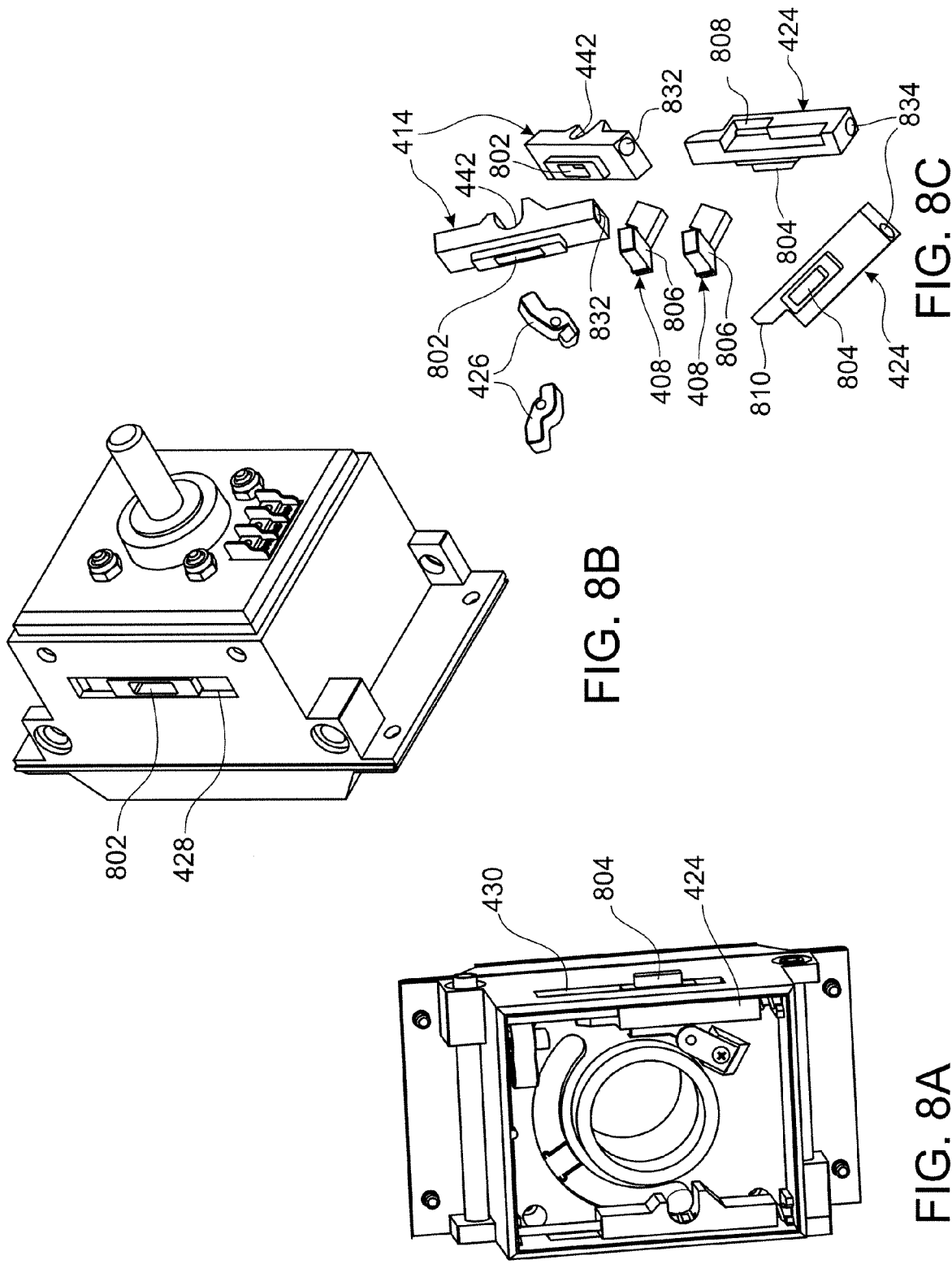
FIG. 8 comprises FIGS. 8A-8C.

Before the rotation ring tab 410 encounters the tab interlock 414, the tab interlock 414 is held in position by the tab interlock spring 432. The tab interlock 414 reaches the second position when the rotation ring tab 410 moves through the rotation channel 416 and fully engages the tab interlock 414 by the rotation tab 410 entering the tab interlock groove 442 as the rotation ring 412 rotates. A tab interlock opening 428 as shown in FIG. 8 is provided adjacent to the tab interlock 414 where the tab interlock 414 can link through the tab interlock opening 428 to another electrical panel module 102, as will be described below.

Figure 7:
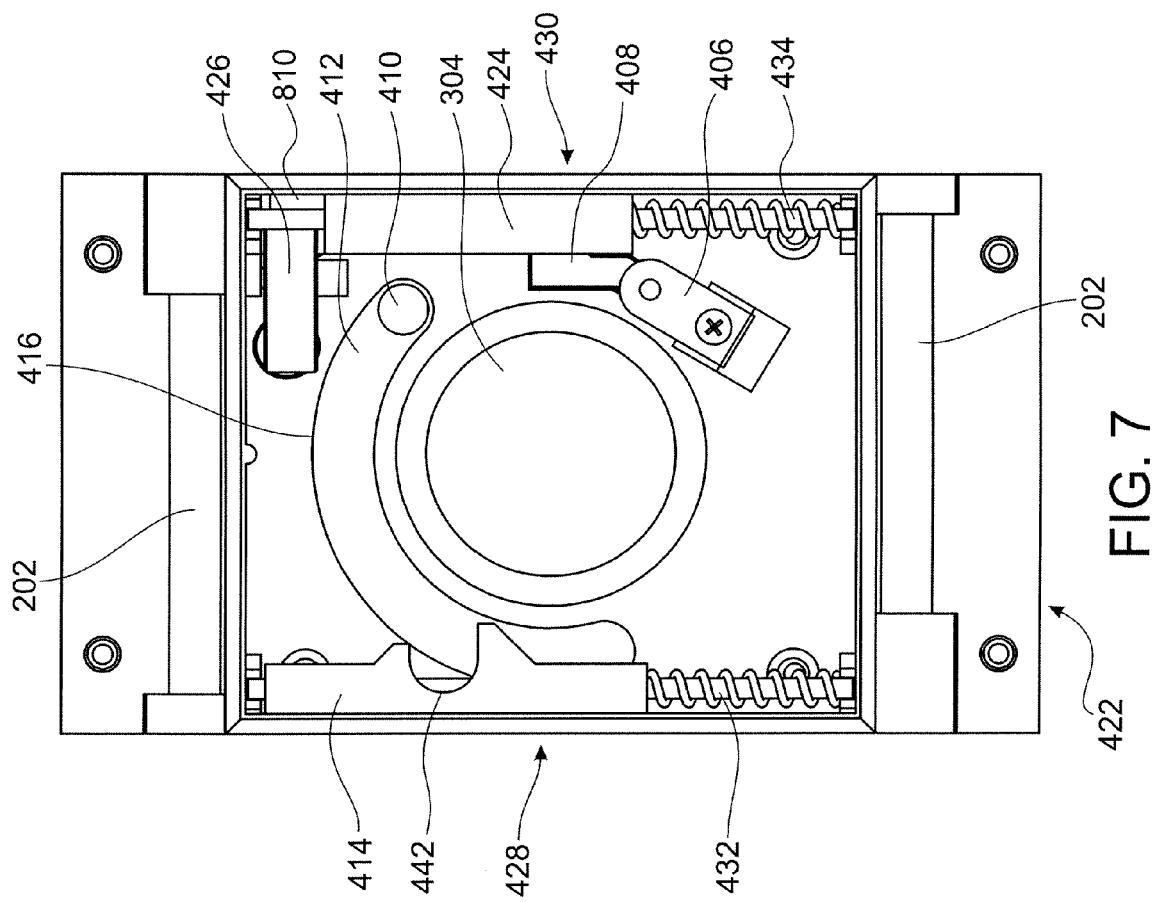
FIG. 7 is a rear elevation view of an electrical panel module configured for use as a non-ground electrical panel module according to an exemplary embodiment.

FIG. 7 is a rear elevation view of an electrical panel module 102 configured for use as a non-ground electrical panel module 422 according to an exemplary embodiment. FIG. 7 includes several additional elements from the ground electrical panel module 402. The non-ground electrical panel module 422 further comprises a cover interlock 424 held in a first position (as illustrated) by a cover interlock spring 434. The cover interlock 424 interfaces in a manner to be described below with the tab interlock 414 of the preceding ground electrical panel module 402 in a manner that allows the cover interlock 424 to be manipulated by either the tab interlock 414 of the preceding ground electrical panel module 402, a tab interlock 414 of a preceding non-ground electrical panel module 422, or the plug rotate lock 408. In the first position, the cover interlock 424 prevents the cover 306 for the non-ground electrical panel module 422 from opening by restricting a cover jam 426, preventing the cover jam 426 from withdrawing from the cover 306. In the exemplary embodiment, the cover jam 426 is a solid member that projects from the interior of the non-ground electrical panel module 422 into the cover 306 and prevents the cover 306 from rotating about the hinge when the cover interlock 424 acts on the cover jam 426. In this embodiment, the cover 306 of the receptacle 302 of the non-ground electrical panel module 422 may not be opened until the cover jam 426 is released by a slide 810 coupled to the cover interlock 424. As long as the cover jam 426 is unable to release, the cover 306 attached to the non-ground electrical panel module 422 may not be opened, thereby preventing connector entry to the receptacle 302 of the module 422. Adjacent to the cover interlock 424 is a cover interlock opening 430 shown in FIG. 8. As shown in FIG. 8, a tooth 804 of the cover interlock 424 projects through the cover interlock opening 430 to interface with a tab interlock 414 of a separate electrical panel module 102. The remaining elements herein operate as they did in the ground electrical panel module 402 and are numbered accordingly.

FIGS. 8A-C and 9 illustrate how various elements aid in interconnectivity between modules. FIG. 8A is a rear perspective view of an electrical panel module 102 showing the cover interlock aperture 430 according to an exemplary embodiment. The cover interlock aperture 430 allows the tooth 804 to extend outside the electrical panel module 442. FIG. 8B is a rear perspective view an electrical panel module 102 showing the tab interlock aperture 428 according to an exemplary embodiment. The tab interlock aperture 428 allows a cavity 802 of the tab interlock 414 to interface with a cover interlock 424 of an adjacent module.

FIG. 8*c* is a perspective view of a series of elements of an electrical panel module 102 according to an exemplary embodiment. Tab interlocks 414 comprise a cavity 802 on a side opposite to the side having the groove 442. The cavity 802 corresponds to a tooth 804 on the cover interlock 424. The tooth 804 and cavity 802 interconnect the cover interlock 424 and tab interlock 414 of their respective modules. When a tab interlock 414 of a module moves to the second position, it forces the cover interlock 424 that it is connected to by means of the tooth 804 and cavity 402 into a second position. The tab interlock 414 further comprises a sleeve 832 that allows the translation from the first position to second position.

Cover interlock 424 comprise an indentation, a slide 810, and a tooth 804. The tooth 804 allows connectivity with an associated tab interlock 414. The indentation allows the plug rotate lock 408 to restrict the movements to the tab interlock 414. The slide allows the door jam 426 to be restricted. The cover interlock 424 further comprises a sleeve 834 that allows the translation from the first position to second position.

Another element is the plug rotate lock 408, which comprises a tab 806 that interconnects to an indentation 808 in the cover interlock 424 when a connector is inserted in an aperture 304.

Another element is the cover jam 426 that prevents the cover 306 over the aperture 304 from opening. Cover jam 426 interacts with the slide 810 in the cover interlock 424. When the cover interlock 424 is in the first position, the slide 810 restricts the cover jam 426 movement. When the cover interlock 424 is in second position, the cover jam 426 is free to release the cover 306.

Figure 9:
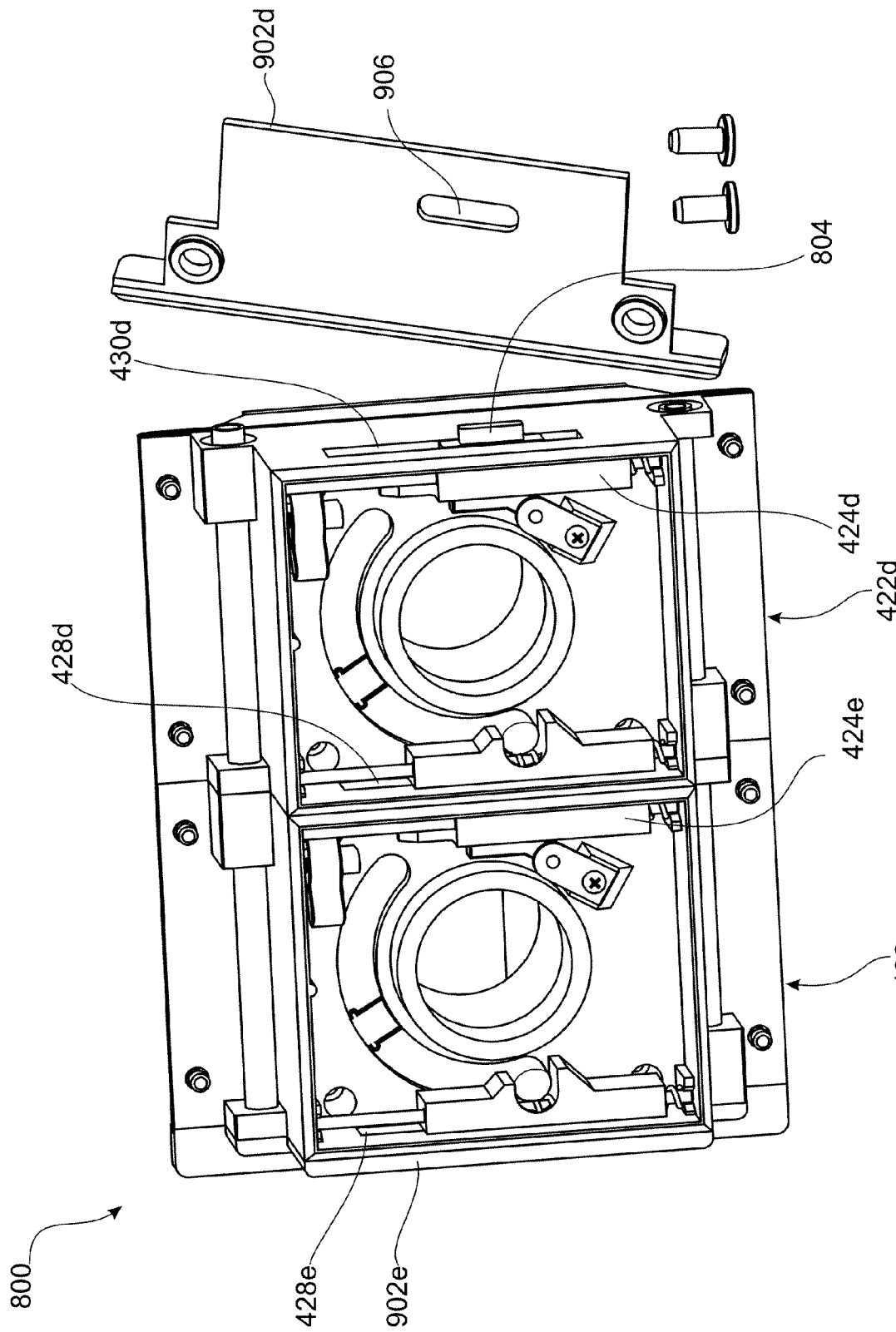
FIG. 9 is a rear perspective view of an electrical panel assembly comprising two non-ground electrical panel modules and having one side panel removed to illustrate how the first electrical panel module is fixed as a modified ground state module while also illustrating how the side panels maintain assembly integrity according to an exemplary embodiment.

FIG. 9 is a rear perspective view of an electrical panel assembly 800 comprising two non-ground electrical panel modules 422*d-e* and having one side panel 902 removed to illustrate how the first electrical panel module 422*d* is fixed as a modified ground state module while also illustrating how the side panels 902 maintain assembly integrity according to an exemplary embodiment. This exemplary embodiment utilizes two non-ground electrical panel modules 422*d-e*. Once the non-ground electrical panel modules 422*d-e* are linked in series, the leading edge of the non-ground electrical panel module 422*d* and the trailing edge of the non-ground electrical panel module 422*e* are not connected to other modules. In this embodiment, the side panel 902*e* covering the non-ground electrical panel module 422*e* covers the opening that allows the tab interlock 414*e* to move freely. At the same time, the side panel 902*d* covering non-ground electrical panel module 422*d* comprises a ground notch 906 that locks the cover interlock 424*d* in the second position. The ground notch 906 acts on the cover interlock 424*d* to release the cover jam 426*d* and the plug rotate lock 408*d*, mimicking the function of a ground electrical panel module 402. If a ground electrical panel module 402 is used, the side panel 902 could cover the empty cover interlock opening 430 of a module 402 where the absent cover interlock 424*d* would reside to maintain integrity.

The side panel 902 in exemplary embodiments also creates the appearance of a single unit from the perspective of the user when the electrical panel modules 422*d-e* are assembled. In exemplary embodiments, the side panel 902 also can have portions that are oriented such that they are level with the front panels of electrical modules. This configuration gives the appearance of a single unit with a flange bordering the entire assembly, such as shown in FIG. 1.

The electrical panel module interconnectivity between the cover interlock 424 and the tab interlock 414 of different modules allows for the safety feature between connections, which necessitates having the ground connected first and disconnected last.

Although these embodiments show a particular set of mechanisms, alternatives to these mechanisms also may be used without departing from the scope and spirit of the exemplary embodiments. The interconnectivity to form an electrical panel assembly 100 may be accomplished by alternative communication means between the modules, including electronic communication between the modules controlling the restrictions described in the exemplary embodiment.

The interaction of the exemplary mechanisms will be explained by way of reference to FIG. 4. All of the elements described in FIGS. 6-9 will be referenced, where elements ending with an 'a' will refer to ground module 402a, elements ending with a 'b' will refer to non-ground module 422b, and elements ending with a 'c' will refer to non-ground module 422c.

As previously discussed with reference to FIG. 4, insertion of a connector though the aperture 304a of ground module 402a will overcome the force on the plug rotate lock spring 406a to release the plug rotate lock 408a, thereby allowing the rotation ring 412a to rotate with rotation of the connector. The rotation ring tab 410a will travel through the rotation channel 416a where it will engage with the tab interlock groove 442a and press the tab interlock 414a against the bias force of the tab interlock spring 432 into the second position. With the rotation ring 412a in the second position, the cam lock engages and fixes the connector to the receptacle 302a, as previously described.

Based on the design of the modules in the exemplary embodiment, the tab interlock 414a of ground module 402a interfaces with the cover interlock 424b of non-ground module 422b. The interface is accomplished via the connection of the tooth 804b of the cover interlock 424b to the cavity 802a of the tab interlock 414a. The connection between the tooth 804b and the cavity 802a occurs by the tooth 804b passing though the cover interlock aperture 430b of the non-ground module 422b and connecting to the cavity 802a visible through the tab interlock aperture 428a of the ground module 402a. With the tab interlock 414a of ground module 402a in the second position, the cover interlock 424b in the non-ground module 422b also enters the second position.

When the cover interlock 424b of non-ground module 422b enters the second position, the slide 810b is no longer adjacent to the cover jam 426b, thereby releasing the cover jam 426b. With the cover jam 426b released, the cover 306b obstructing the entrance to the receptacle 302b can now open, allowing a second connector to be inserted through the aperture 304b. The rotation ring 412b is held in the first position by a spring that cannot be counteracted until the second connecter is installed. With the second connector installed, the rotation ring tab 410b will travel through the rotation channel 416b with rotation of the second connector, where it will engage with the tab interlock grove 442b and press the tab interlock 414b into the second position. With the rotation ring 412b and the tab interlock 414b in the second position, the cam lock engages and fixes the second connector to the receptacle 302b.

When the second connector is inserted into the aperture 304b of non-ground module 422b, the plug rotate lock 408b will be placed into the second position. The plug rotate lock 408b then interacts with a tab interlock 414b by connecting with indentation 808b in the tab interlock 414b, which allows the plug rotate lock 408b to keep the cover interlock 424b from returning to the first position. Until the plug rotate lock 408b returns to the first position, cover interlock 424b will be unable to return to the first position. The plug rotate lock 408b will not return to the first position until the connector has been removed from the aperture 304b. Due to the previously discussed connection between the tooth 804b of the cover interlock 424b and the cavity 802a of the tab interlock 414a of the ground module 402a, the tab interlock 414a in the ground module 402a cannot return to the first position, forcing the rotation ring 412a to stay in the second position, since the rotation ring tab 410a is held in place by the tab interlock groove 442a to force the connector to stay connected to the receptacle 302a in the ground electrical panel module 402. Thus, the ground connector in the ground module 402a cannot be removed until the second connector is removed from the non-ground module 422b.

The process from the non-ground module 422b continues in the non-ground module 422c based on the design of the exemplary embodiment. With the attachment of the second connector to the non-ground module 422b, the tab interlock 414b of the non-ground module 422b interfaces with the cover interlock 424c of the non-ground module 422c. The interface is accomplished via the connection of the tooth 804c of the cover interlock 424c to the cavity 802b of the tab interlock 414b. The connection between the tooth 804c and the cavity 802b occurs by the tooth 804c passing though the cover interlock aperture 430c of the non-ground module 422c and connecting to the cavity 802b visible through the tab interlock aperture 428b of the non ground module 422b. With the tab interlock 414b of non-ground module 422b in the second position, the cover interlock 424c in non-ground module 422c also enters the second position.

When the cover interlock 424c of non-ground module 422c enters the second position, the slide 810c is moved away from the cover jam 426c, thereby releasing the cover jam 426c. With the cover jam 426c released, the cover 306c obstructing the entrance to the aperture 304c can now open, allowing a third connector to be inserted through the aperture 304c. The rotation ring 412c is held in the first position by a spring that cannot be counteracted until the third connecter is installed. The rotation ring tab 410c will travel through the rotation channel 416c with rotation of the third connector where it will engage with the tab interlock groove 442c and press the tab interlock 414c into the second position.

When the third connector is inserted into the aperture 304c of non-ground module 422c, the plug rotate lock 408c will be placed into the second position. The plug rotate lock 408c then interacts with the cover interlock 424c by connecting with the indentation 808c in the tab interlock 414c, which allows the plug rotate lock 408c to keep the cover interlock 424c from returning to the first position. Until the plug rotate lock 408c returns to the first position, cover interlock 424c will be unable to release. The plug rotate lock 408c will not return to the first position until the third connector has been removed from the aperture 304c. Due to the previously discussed connection between the tooth 804c of the cover interlock 424c and the cavity 802b of the tab interlock 414b of the non-ground module 422b, the tab interlock 414b in the non-ground module 422b cannot return to the first position, forcing the rotation ring 412b to stay in the second position since the rotation ring tab 410b is held in place by the tab interlock groove 442b to force the connector to stay connected to the receptacle 302b in the non-ground electrical panel module 422b. Thus, the second connector in the non-ground module 422b cannot be removed until the third connector is removed from the non-ground module 422c.

To disconnect the connectors from their respective receptacles 302, the connectors must be decoupled from the receptacles 302 in reverse order. In the exemplary embodiment, the tab interlock 414c of non-ground module 422c is not fixed in position, allowing the rotation ring 412c to return to the first position with rotation of the third connector to remove the third connector. When the third connector is removed from non-ground module 422c, the force acting on the plug rotate lock 408c is removed and the plug rotate lock 408c returns to the first position. With the plug rotate lock 408c in the first position, the plug rotate lock 408c is disengaged from the cover interlock 424c of non-ground module 422c.

With the release of the cover interlock 424c of non-ground module 422c, the tab interlock 414b of non-ground module 422b now may return to the first position. As a result of the tab interlock 414b of non-ground module 422b being able to return to the first position, the associated rotation ring 412b is now freely rotatable since the tab interlock groove 442b can release the rotating ring tab 410b. The rotation ring 412b is now rotated to the first position with rotation of the second connector to remove the second connector from non-ground module 422b. When the rotation ring 412b returns to the first position, the tab interlock spring 432b acting on the tab interlock 414b of non-ground module 422b and the cover interlock spring 434c acting on the cover interlock 424c of non-ground module 422c force both components back to the first position. With the cover interlock 424c of non-ground module 422c in the first position, the cover jam 426c of non-ground module 422c is engaged by the slide 810c, preventing the cover 306c of non-ground module 422c from opening and preventing a connector from being installed in the aperture 304c.

When the second connector is removed from non-ground module 422b, the force acting on the plug rotate lock 408b is removed and the plug rotate lock 408b returns to the first position. With the plug rotate lock 408b in the first position, the plug rotate lock 408b is disengaged from the cover interlock 424b of non-ground module 422b.

With the release of the cover interlock 424b of non-ground module 422b, the tab interlock 414a of ground module 402a now may return to the first position. As a result of the tab interlock 414a of ground module 402a being able to return to the first position, the associated rotation ring 412a is now freely rotatable since the tab interlock groove 442a can release the rotating ring tab 410a. The rotation ring 412a is now rotated to the first position with rotation of the first connector to remove the first connector from ground module 402a. When the rotation ring 412b returns to the first position, the tab interlock spring 432a acting on the tab interlock 414c of ground module 402a and the cover interlock spring 434b acting on the cover interlock 424b of non-ground module 422b force both components back to the first position. With the cover interlock 424b of non-ground module 422b in the first position, the cover jam 426b of non-ground module 422b is engaged by the slide 810b, thereby preventing the cover 306b of non-ground module 422b from opening and preventing a connector to be installed in the aperture 304b.

When the first connector is removed from ground module 402a, the force on the plug rotate lock 408a is removed. Since this is a ground module 402a, there is no other module on which to act. The cover 306a may still be opened for a new ground connector to be installed.

According to an exemplary embodiment, the ground module 402a and the non-ground modules 422b-c may include an additional safety feature that restricts the decoupling of connectors from their respective modules 402, 422. The cover jam 426 may be designed such that the cover jam 426 may not allow the cover interlock 424 to return to first position until the cover 306 is closed. As a result, a ground module 402 or a non-ground module 422 would not be able to release the associated connector unless the cover 306 of the subsequent module 422 is closed according to an exemplary embodiment. Such an exemplary embodiment is described hereinafter with reference to FIGS. 29-31.

According to an exemplary embodiment, a lock ring 104a (FIG. 1) may be attached to the cover 306a. When the cover 306a is closed, a locking mechanism may be attached to the lock ring 104a to prevent the cover 306a from opening. Based on an exemplary embodiment, when cover 306a cannot open, then none of the subsequent covers 306b-c can open. Additionally, lock rings 104 may be attached to any other cover 306 or module 102, which prevents the locked cover 306 and any subsequent cover 306 from being opened when externally locked.

Alternative embodiments may include an electrical panel assembly 100 wherein the first electrical panel module 102a may be a module other than a ground module 402. For example, a non-ground module 422 may be used as the first electrical panel module 102a in an electrical panel assembly 100, if desired.

Figure 10:
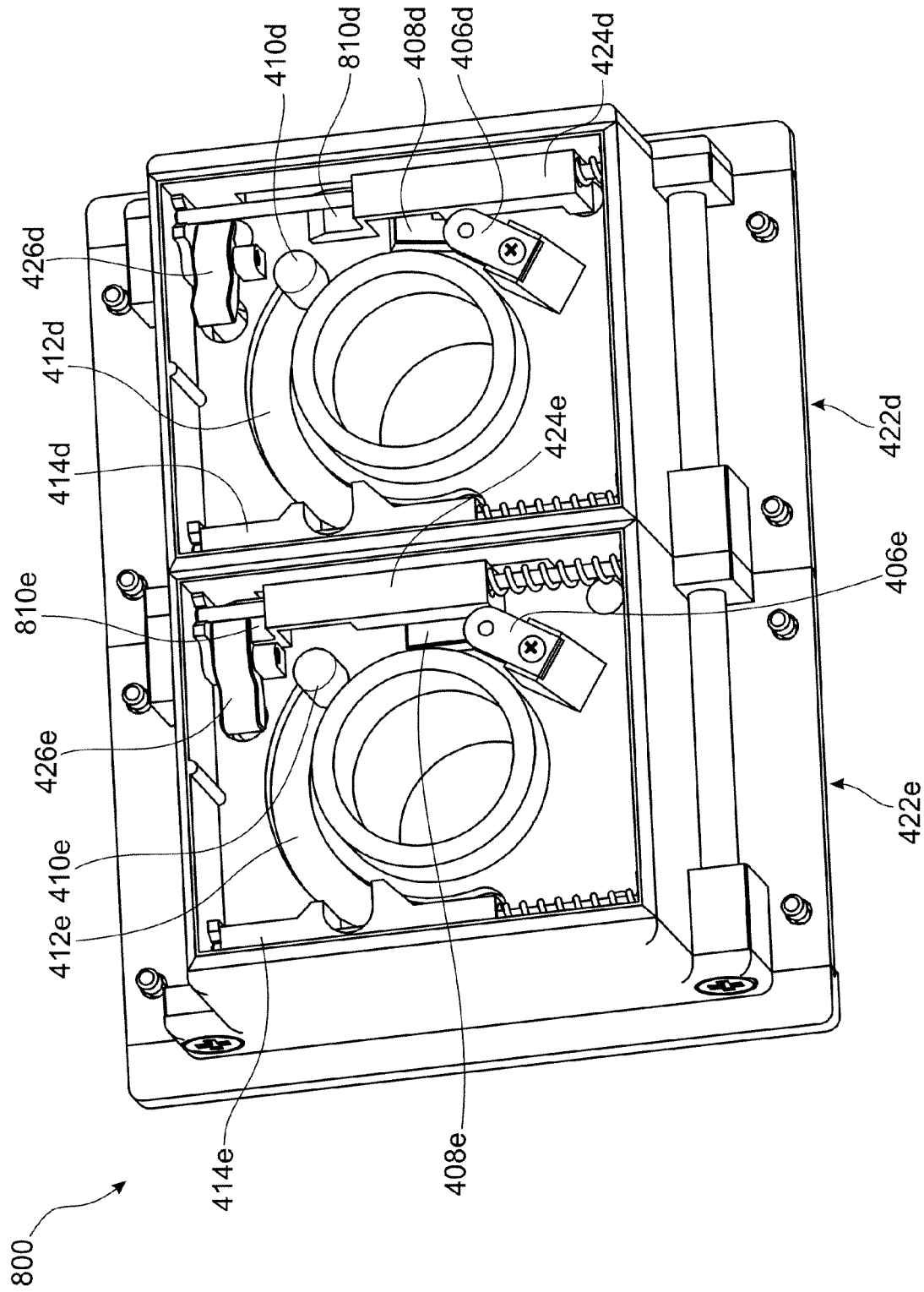
FIG. 10 is a rear perspective view of two electrical panel modules forming an electrical panel assembly where the first electrical panel module is configured as a ground module and the second electrical panel module is a non-ground module according to an exemplary embodiment.
Figure 11:
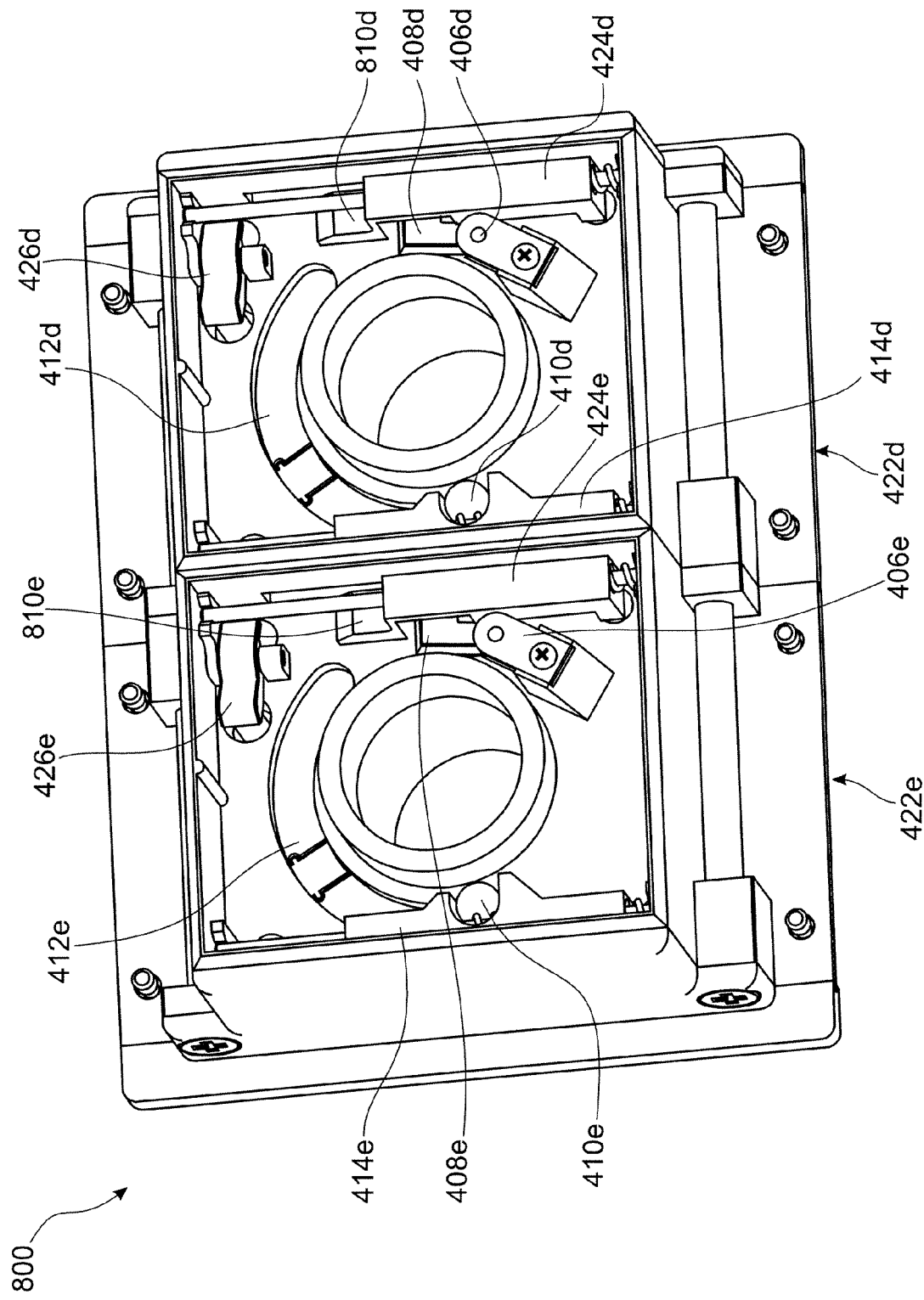
FIG. 11 is a rear perspective view of the electrical panel assembly of FIG. 10 and having connectors installed into the assembly according to an exemplary embodiment.

FIGS. 10 and 11 provide a perspective view of a two electrical panel module assembly 800. FIG. 10 is a perspective view of the rear of two electrical panel modules 422d-e forming the electrical panel assembly 800, where the electrical panel module 422d is configured as a ground module and the electrical panel module 422e is a non-ground module according to an exemplary embodiment. Module 422d is set to a ground configuration by use of a side panel 902d. Module 422d is connected to a second non-ground electrical panel module 422e. FIG. 10 shows module 422d with cover interlock 424d in the second position, releasing the cover jam 426d, but with the plug rotate lock 408d, rotation ring 412d, and tab interlock 414d in the first position. Non-ground electrical panel module 422e shows tab interlock 414e in the first position, with the plug rotate lock 408e, rotation ring 412e, and cover interlock 424e also in the first position. Module 422d is configured to accept a connector, while non-ground electrical panel module 422e currently may not accept a connector due to the cover jam 426e causing the cover to remain closed.

FIG. 11 is a rear perspective view of the electrical panel assembly 800 of FIG. 10 where the elements in second position as if the connectors have been installed. Module 422d and non-ground electrical panel module 422e have cover interlocks 424d-e, the cover jams 426d-e, and the cover rotate plug locks 408d-e all in the second position. The connector for non-ground electrical panel module 422e can be removed since nothing is restricting the tab interlock 414e in non-ground electrical panel 422e. However, as long as a connector is inserted in non-ground electrical panel module 422e, the cover interlock 424e of non-ground electrical panel 422e will remain fixed, preventing tab interlock 414d in module 422d from allowing the rotation ring 412d to release the connector in module 422d.

The electrical panel modules 102 are constructed from materials suited to use in the electrical industry. In an exemplary embodiment, materials will be used to make the electrical panel modules 102 lighter and more water resistant. The front panel may be made of stainless steel. Lip seals (not shown) on the covers and gaskets (not shown) protect the internal connections of the receptacles from exposure to water. Rotation rings 412 may also be watertight. O-rings provide seals for various components. Tongue and groove seals 204 provide protection between the side panels and the associated electrical panel modules. The side and rear casings can be constructed from synthetic material. An example would be fiberglass type plastics. Areas that need less strength could utilize micro-blend materials.

Figure 12:
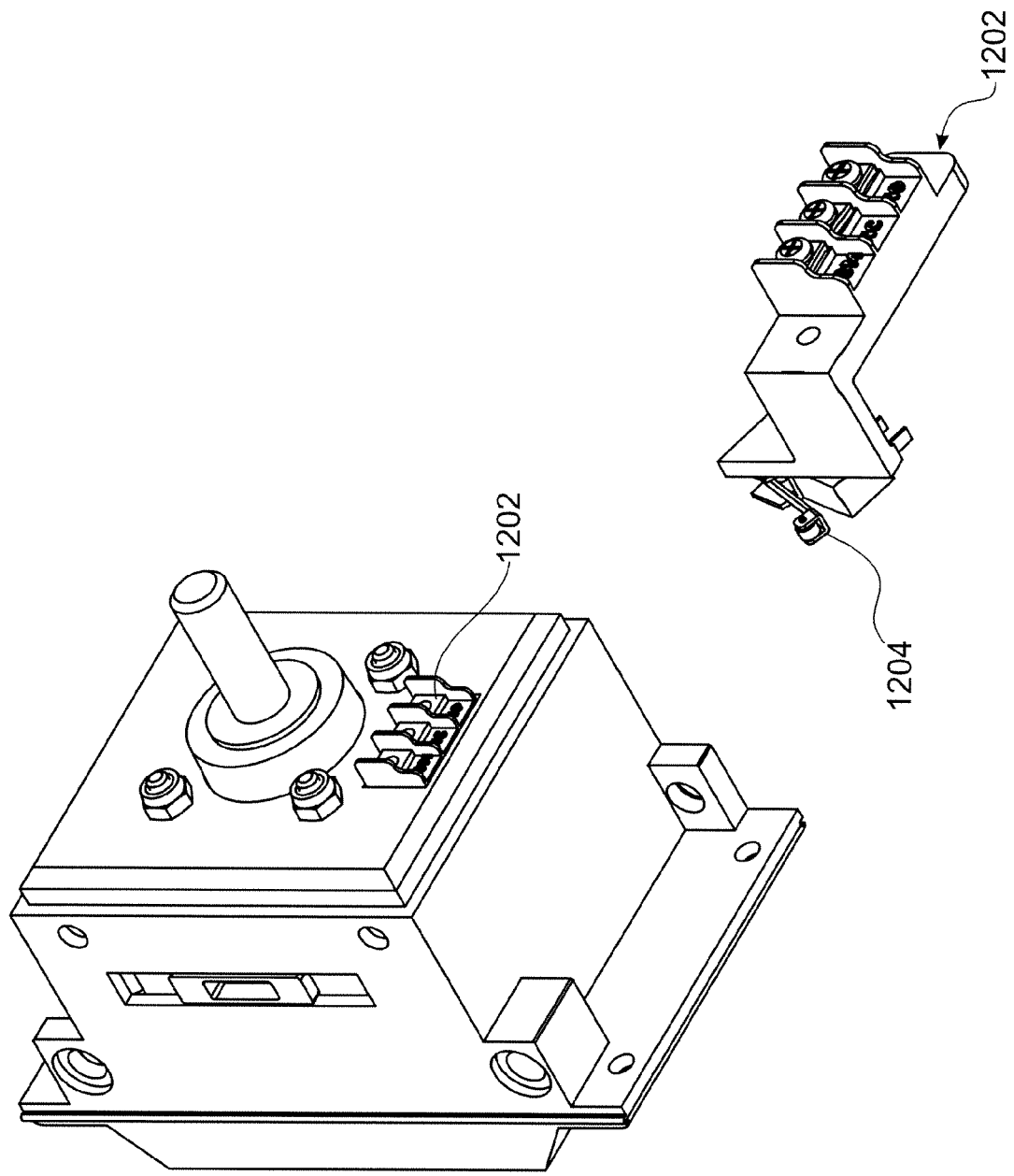
FIG. 12 is a perspective view of an module comprising a limit switch according to an exemplary embodiment.

FIG. 12 is a perspective view of an assembly 1200 comprising a limit switch 1202 according to an exemplary embodiment. A limit switch 1202 is an electrical device that can detect motion with respect to the respective electrical panel modules 102. In the exemplary embodiment, the limit switch 1202 has an arm 1204 that freely rotates. Such a limit switch 1202 would be used in the assembly where the unit is opened with a hinge 1306, as shown in FIG. 13 in a stackable panel assembly 1300 which will be discussed below. This limit switch 1202 can be set to interrupt power to the electrical panel modules 102 in the event the modules 102 are opened by detecting a rotation of, for example, forty five degrees or more about the hinges. One advantage in the use of a limit switch 1202 is that in the event a electrical panel assembly 1300 has to be opened to inspect the electrical panel modules 102, the limit switch 1202 detects those non-nominal positions to prevent shock to personnel.

The electrical panel modules 102 now connected in series can be installed in any location where an electrical panel assembly 100 would be used. This location can include being made a component of a preexisting electrical panel. Other examples include the completed unit being placed in a cavity in a wall or other configuration where the electrical panel modules 102 are visible.

FIG. 13 is a perspective view of an assembly 1300 having individual electrical panel modules 102a-c integrated with stackable electrical panels 1302a-c to form a stackable electrical panel assembly 1300 according to an exemplary embodiment. Each stackable electrical panel 1302 comprises an individual electrical panel module 102 and housing 1304 to hold the electrical panel module 102 independently of any previously existing support structure. These stackable electrical panels 1302 can be connected together to form a stackable panel assembly 1300 comprising the individual electrical panel modules 102. The stackable panel assembly 1300 comprises all the connections necessary to connect the individual electrical panel modules 102 and housings 1304 to their respective cables as shown in FIG. 13.

Figure 14B:
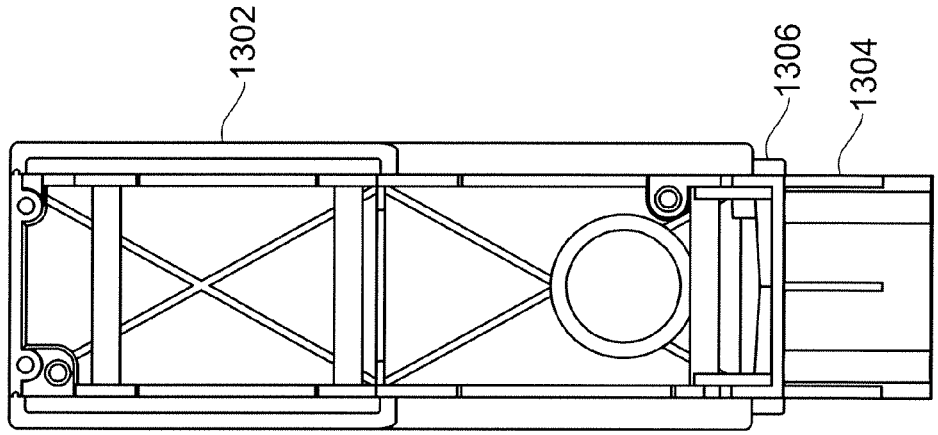
FIG. 14B is an elevation view of a housing of a stackable electrical panel illustrated in FIG. 13 according to an exemplary embodiment.
Figure 14A:
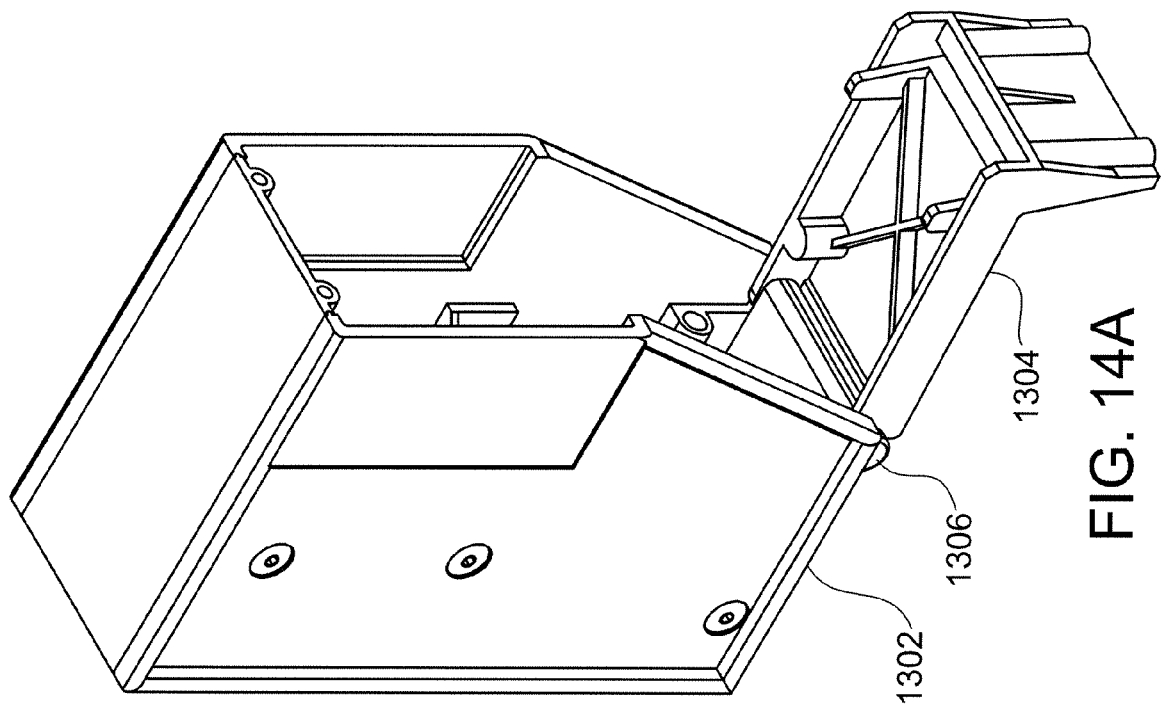
FIG. 14A is a perspective view of a housings of the stackable electrical panels illustrated in FIG. 13 according to an exemplary embodiment.
Figure 15:
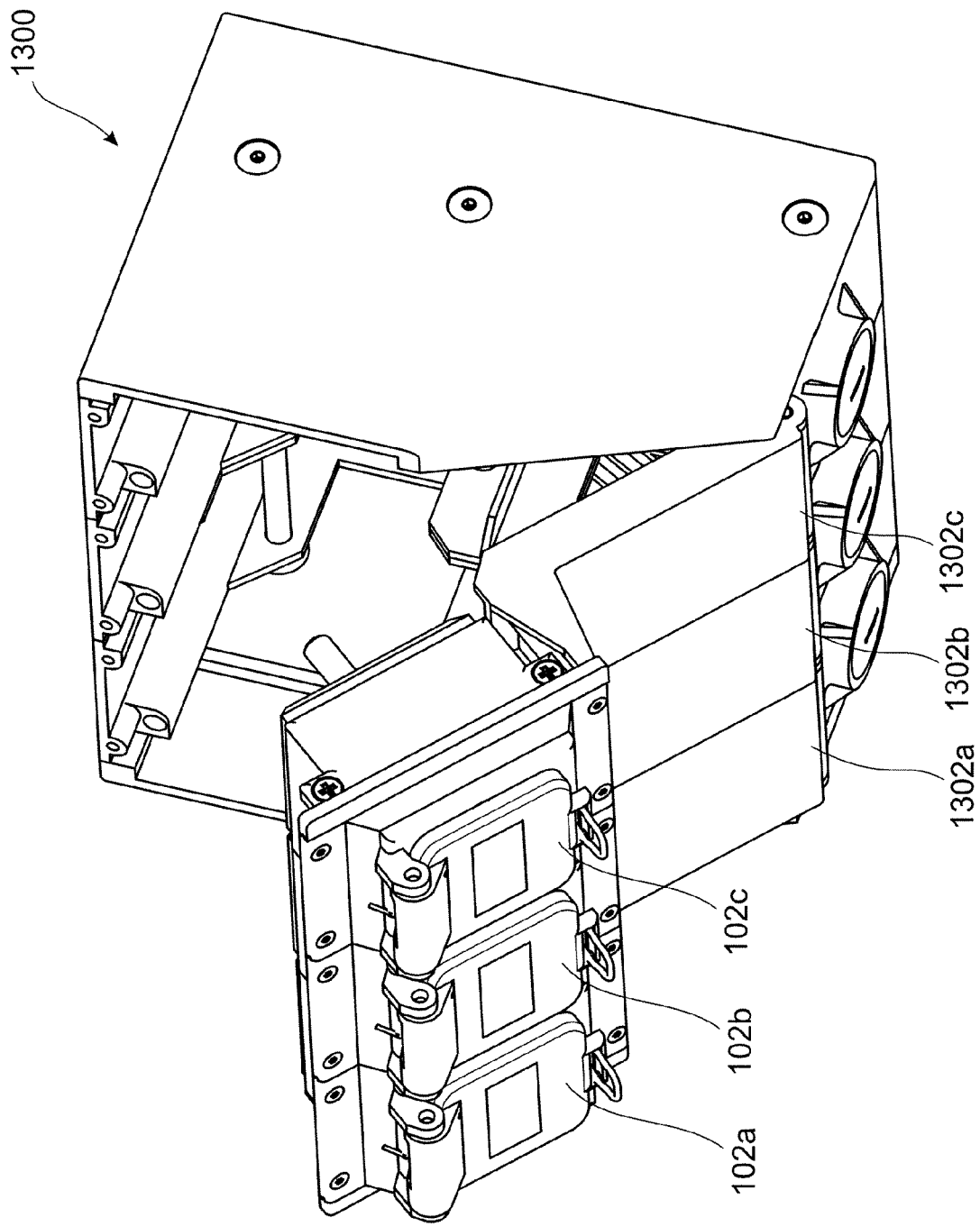
FIG. 15 is a perspective view of a stackable electrical panel assembly opened to allow a user to inspect the electrical panel modules according to an exemplary embodiment.
Figure 16:
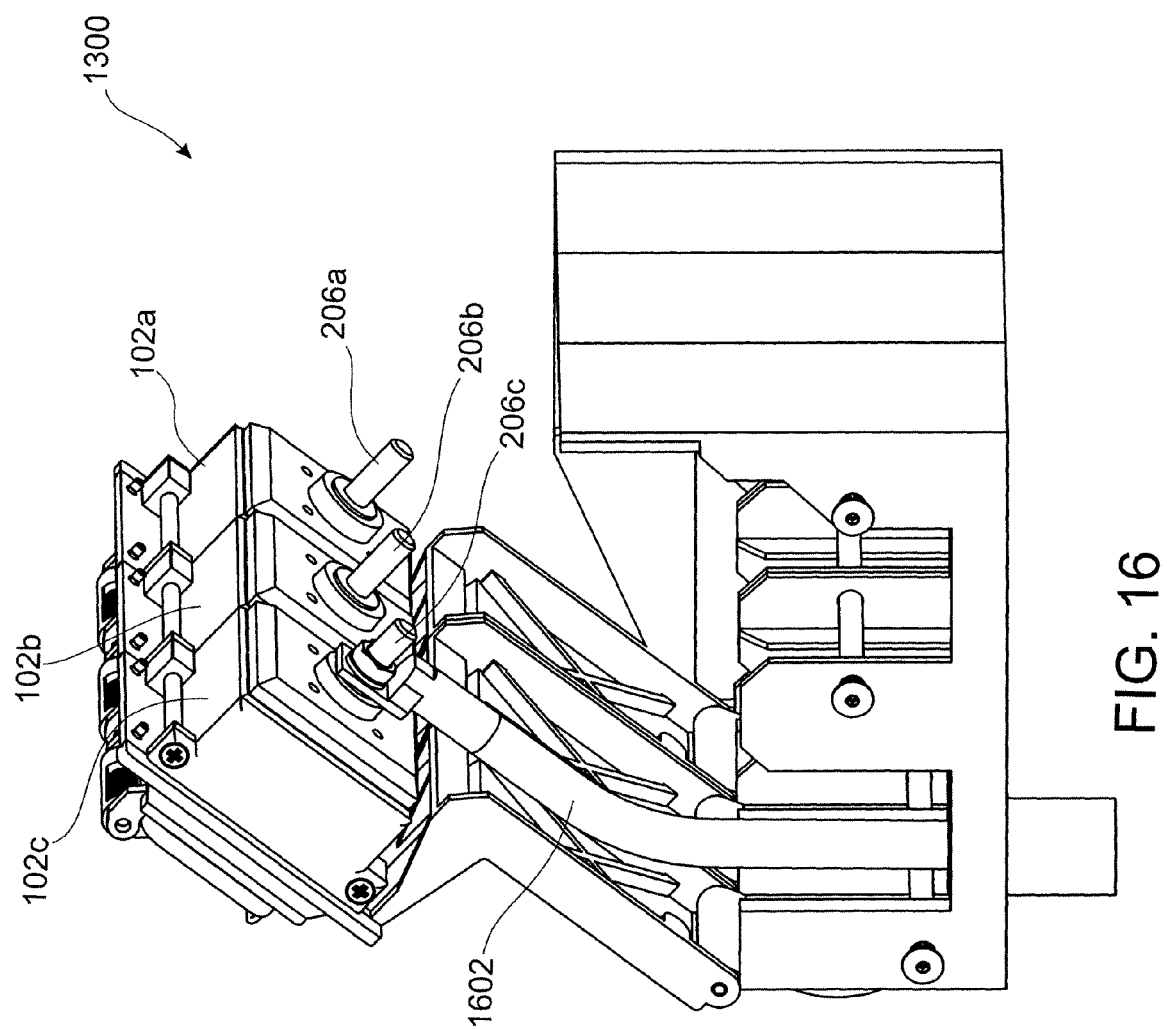
FIG. 16 is a perspective view of the stackable electrical panel assembly from FIG. 15 opened to allow a user to inspect the electrical connection between the electrical panel modules and the power supply according to an exemplary embodiment.
Figure 17:
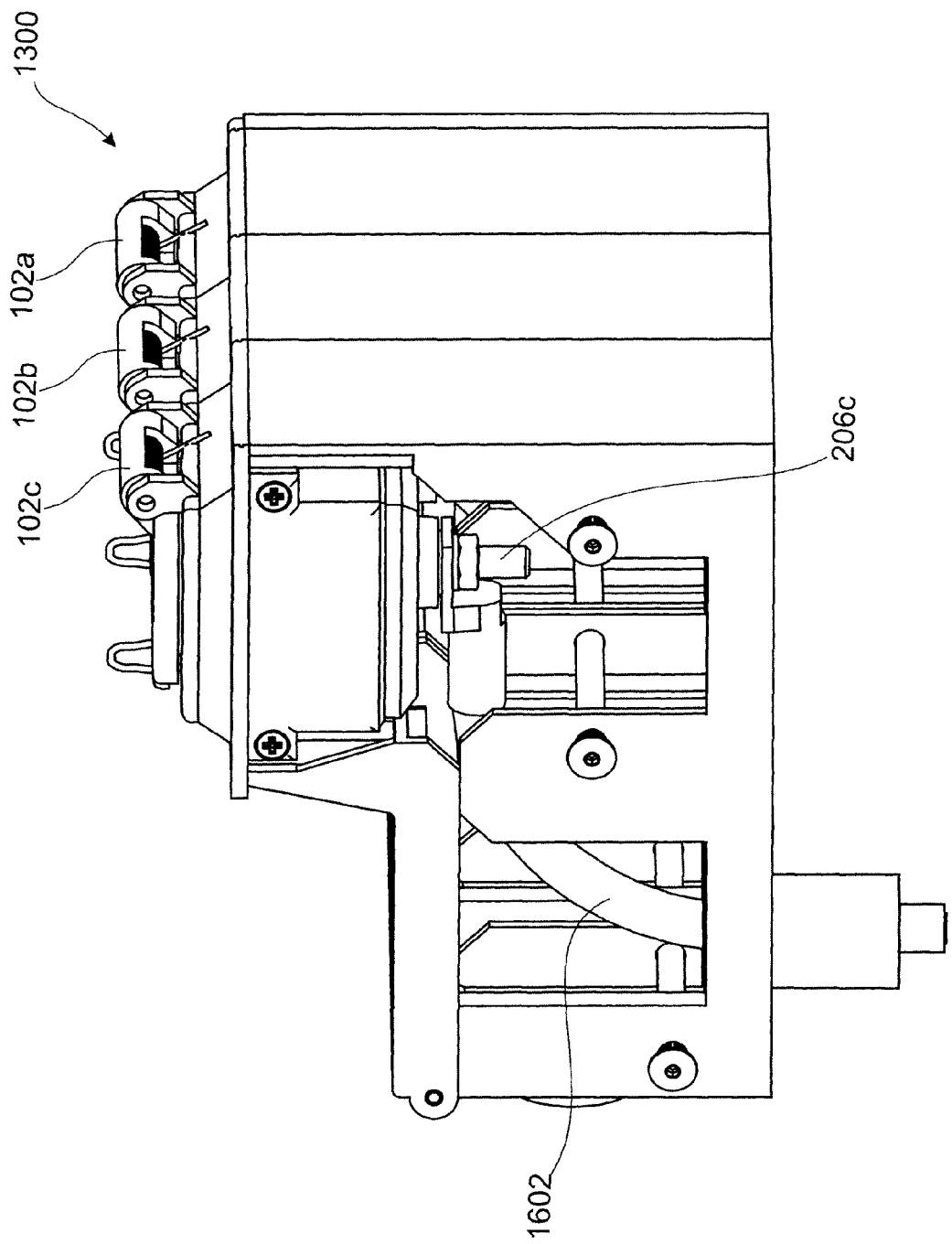
FIG. 17 is a perspective view of the stackable electrical panel assembly from FIG. 15 when closed according to an exemplary embodiment.

FIG. 14A is a perspective view of a housing 1304 of the stackable electrical panels illustrated in FIG. 13 according to an exemplary embodiment. FIG. 14B is a rear elevation view of the housing 1304 of the stackable electrical panel illustrated in FIG. 13 according to an exemplary embodiment. In the exemplary embodiment, the individual electrical modules 102 are mounted on housing 1304 illustrated in FIG. 14A that may be opened to reveal the back portion of the electrical panel modules 102 for inspection or repair. FIG. 15 is front a perspective view of a stackable electrical panel 1300 assembly opened to allow a user to inspect the electrical panel modules 102 according to an exemplary embodiment. FIG. 16 is a rear perspective view of the stackable electrical panel assembly 1300 from FIG. 15 opened to allow a user to inspect the electrical connection 1602 between the electrical panel modules 102 and the power supply according to an exemplary embodiment. FIG. 17 is a perspective view of the stackable electrical panel assembly 1300 from FIG. 16 when closed according to an exemplary embodiment.

Stackable panel assemblies 1300 are assembled in the same manner as the individual electrical panel modules 1302. Each stackable electrical panel 1302 connects to another stackable electrical panel 1302 in such a manner that the electrical power modules can interconnect as previously described. The stackable electrical panel assemblies also can connect in other suitable methods to maintain the disclosed safety features.

Figure 18:
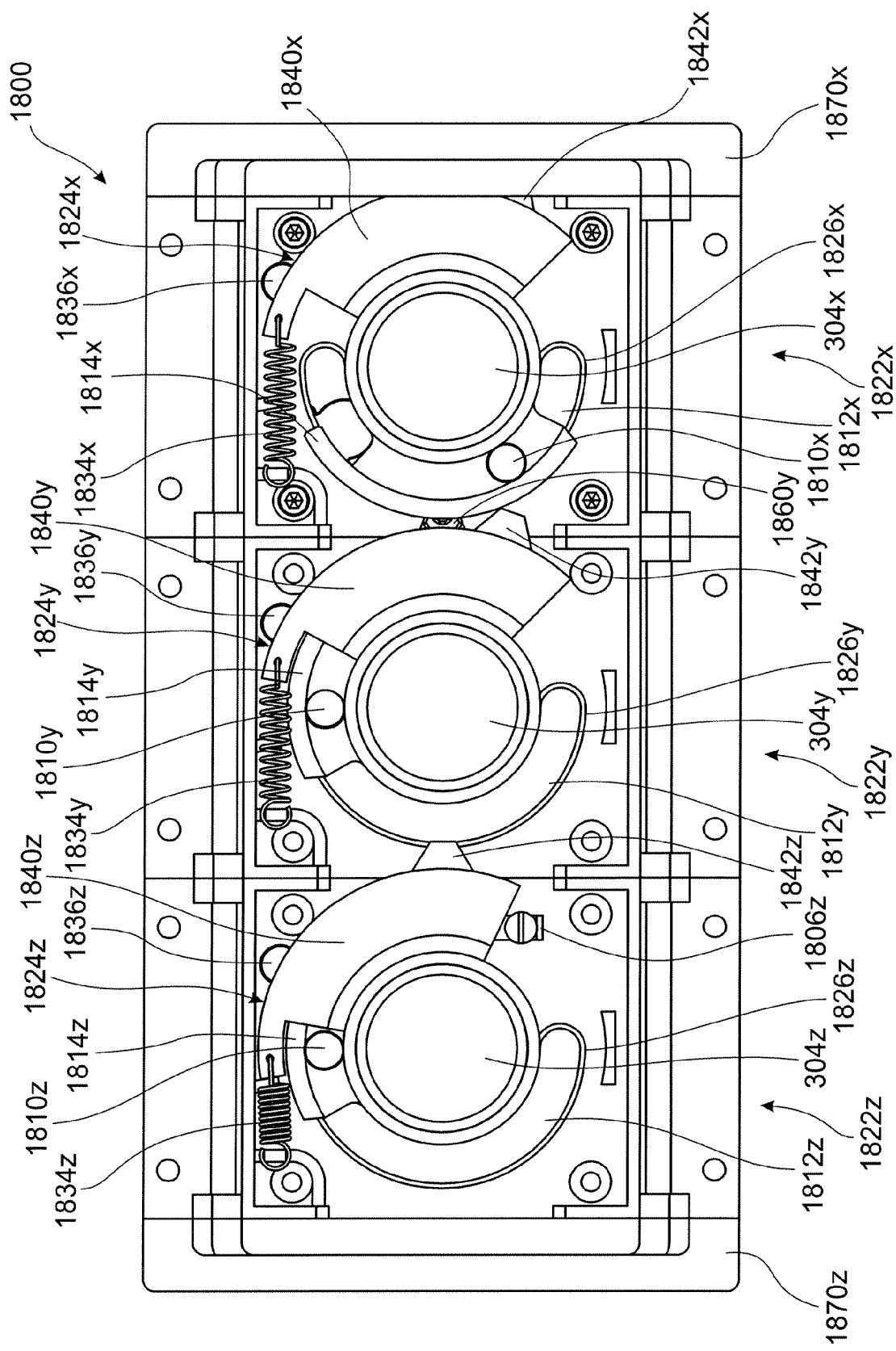
FIG. 18 is a rear perspective view of an electrical panel assembly comprising three interconnected cam electrical panel modules according to an exemplary embodiment.

Alternatives to the previously disclosed apparatus include the use of different mechanisms to practice the apparatus. FIG. 18 is a rear perspective view of an electrical panel assembly 1800 comprising three cam electrical panel modules 1822x-z according to an alternative exemplary embodiment.

Elements will be referred to from right to left due to the view being from the rear perspective. Referring to FIG. 1, the rear view of cam electrical panel module 1822x corresponds to 102a, the rear view of cam electrical panel module 1822y corresponds to 102b, and the rear view of cam electrical panel module 1822z corresponds to 102c. A single cam electrical panel module 1822 with elements in first position will be discussed with reference to FIG. 19. The single cam electrical panel module 1822 with elements in second position will be discussed with reference to FIG. 20.

Figure 19:
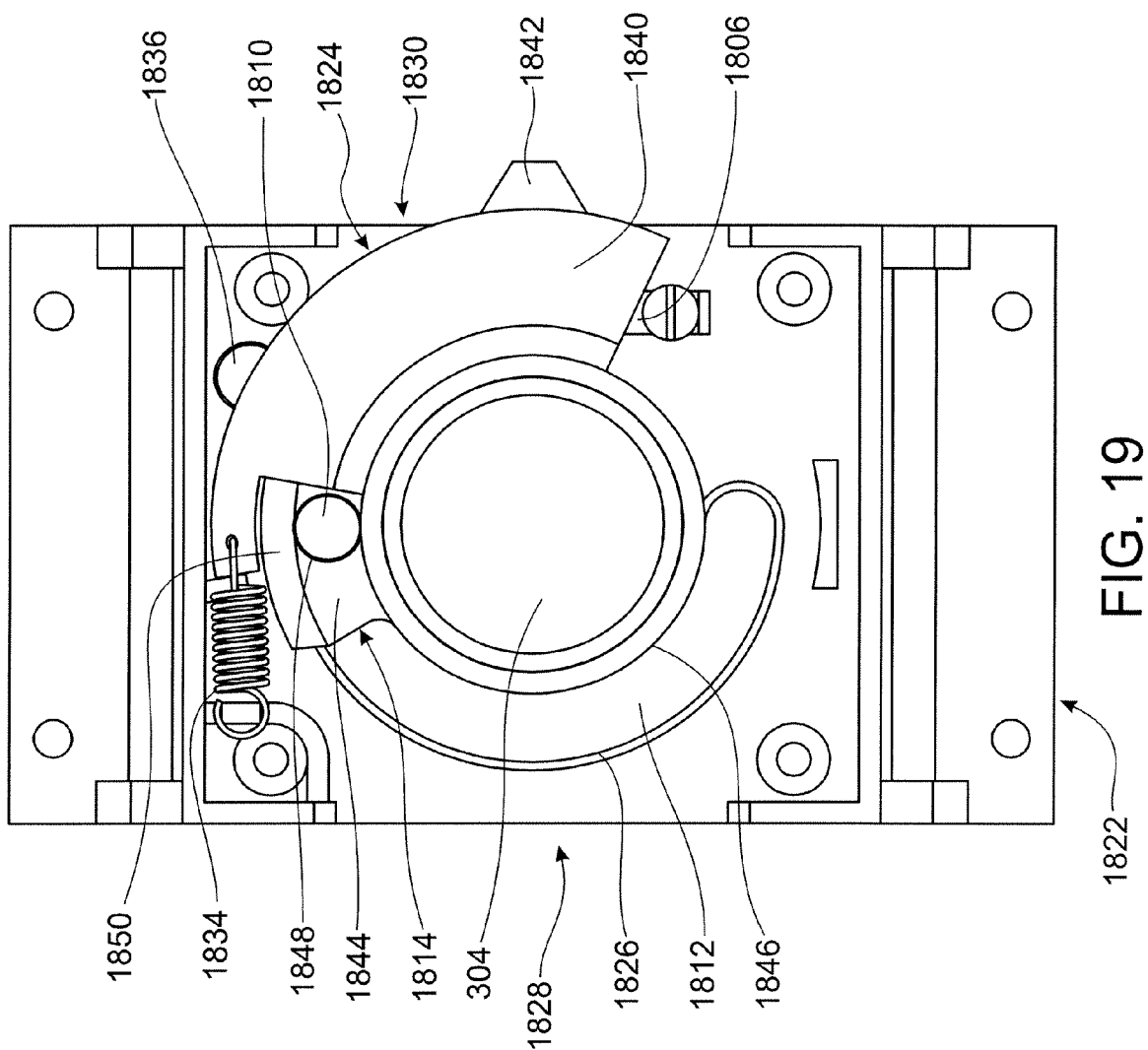
FIG. 19 is a perspective view of a cam electrical module where both a cover cam interlock and a tab cam interlock are in the first position according to an exemplary embodiment.

FIG. 19 is an elevation view of a cam electrical module 1822 where both a cover cam interlock 1824 and a tab cam interlock 1814 are in the first position according to an exemplary embodiment. In the exemplary embodiment, the cover cam interlock 1824 in the first position corresponds to the preceding cam electrical panel module 1822 without a connector installed. A tab cam interlock 1814 in the first position corresponds to a configuration without a connector in the receptacle 302 of the module 1822.

The cover 306 for the cam electrical panel module 1822 is controlled by a cover lock pin 1836. The cover lock pin 1836 in a first position extends toward the cover 306, preventing the cover 306 from opening. A biasing device (not shown) exerts a force to move the cover lock pin 1836 to a second position, where the cover lock pin 1836 is removed from the cover 306 and allows the cover 306 to open.

Figures 22, 23, 24:
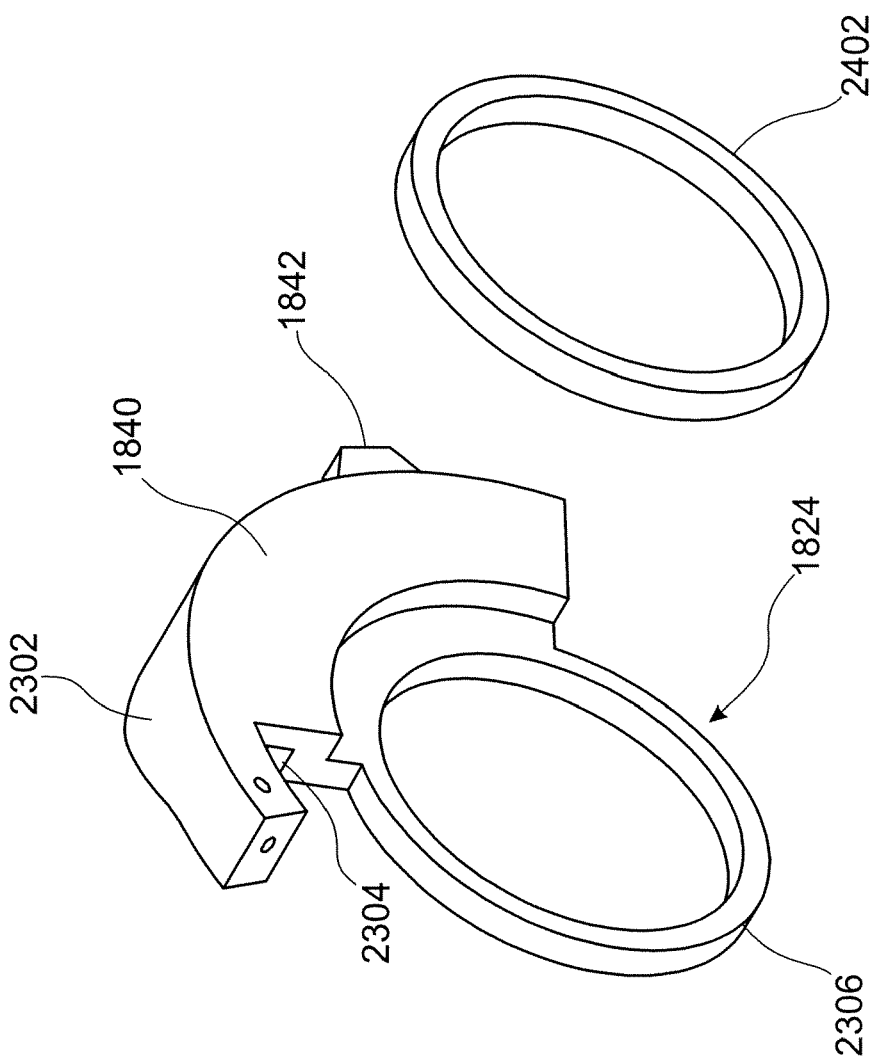
FIG. 22 is an angular perspective view of the tab cam interlock of FIG. 19 according to an exemplary embodiment.
FIG. 23 is an angular perspective view of the cover cam interlock of FIG. 19 according to an exemplary embodiment.
FIG. 24 is an angular perspective view of a spacer according to an exemplary embodiment of FIG. 19 according to an exemplary embodiment.

The cover cam interlock 1824 is freely rotatable around the aperture 304. Referring to FIG. 23, the cover cam interlock 1824 comprises a ring 2306 that operably couples the cover cam interlock 1824 to the module 1822, and a molded cover cam interlock quarter circular component 1840. The cover cam interlock quarter circular component 1840 comprises three physical features. The rear of the cover cam interlock quarter circular component 1840 comprises a tapered surface 2302. As a result of the tapered surface 2302 rotating as part of the cover cam interlock 1824, the distance between the rear of the cover cam interlock 1824 and a fixed point on the surface of the cam electrical module 1822 changes based on the rotation of the cover cam interlock 1824. The tapered surface 2302 allows the cover cam interlock 1824 to apply a force to the cover lock pin 1836 depending on the orientation of the cover cam interlock 1824 with respect to the cover lock pin 1836.

Another feature of the cover cam interlock quarter circular component 1840 includes a concave portion 2304 capable of receiving at least a portion of the tab cam interlock 1814. The concave portion 2304 allows the tab cam interlock 1814 to partially reside behind the cover cam interlock 1824 depending on the position of the rotation ring 1812 and cover cam interlock 1824. Another feature of the cover cam interlock quarter circular component 1840 is a projection 1842. The projection 1842 is designed to extend into the area that may be occupied by the tab cam interlock 1814 of a preceding cam electrical panel module in a cam electrical panel assembly 1800. The projection 1842 may extend outside the cam interlock module 1822 through a cover cam lock aperture 1830 that is substantially similar to the cover lock aperture 430 previously described. The projection 1842 may enter a cam interlock module 1822 though a tab cam interlock aperture 1828 that is substantially similar to the tab interlock aperture 428 previously described.

The cover cam interlock 1824 is normally held in the first position by a biasing element. In the exemplary embodiment, the biasing element is a spring 1834. In an exemplary embodiment, the spring 1834 may be coupled to the cam electrical panel module 1822 by a return spring support, such as a cotter pin. The projection 1842 is designed such that when the tab cam interlock 1814 of a preceding cam electrical panel module 1822 rotates through the area occupied by the projection 1842 when the cover cam interlock 1824 is in the first position, the projection 1842 is acted on and the cover cam interlock 1824 rotates clockwise to the second position in response. Alternatively, the cover cam interlock 1824 may be moved to the second position by a specially constructed side plate with a ground notch designed to place the tab cam interlock 1814 in the second position.

With the cover 306 opened, the connector interacts with the rotation ring 1812 when rotated, which facilitates connections between the transmitting contacts of the module and the receiving contacts of the connector. The rotation ring 1812 comprises a receptacle 302 and a rotation ring tab 1810 that extends in a direction opposite from the direction of the receptacle 302 and is located substantially on the outer diameter of the rotation ring 1812.

Figure 27:
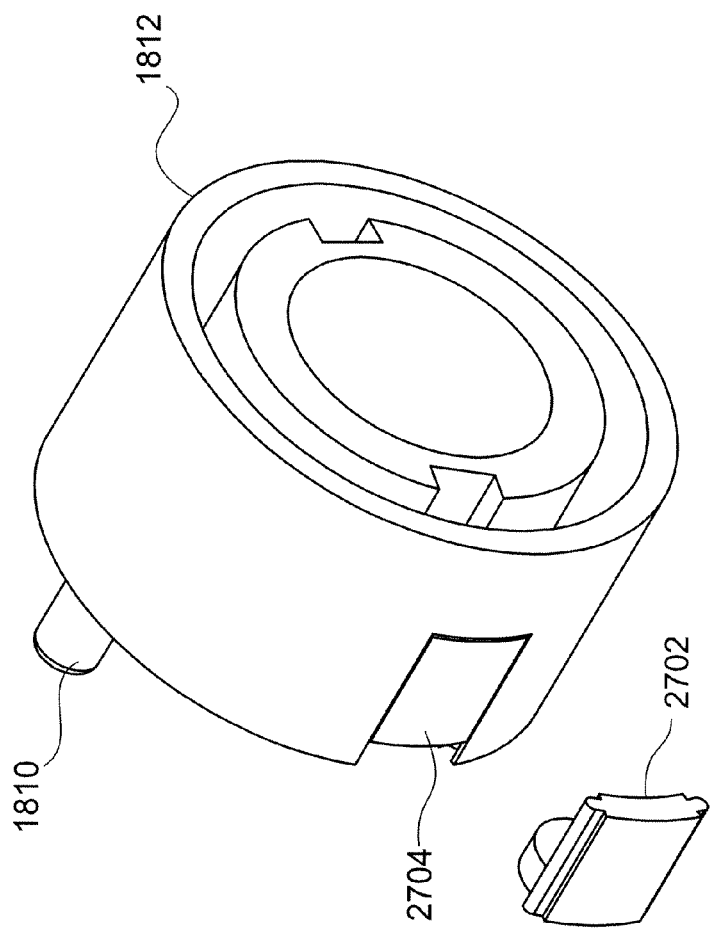
FIG. 27 is an angular perspective view of the rotation ring of FIG. 19 according to an exemplary embodiment.

Referring to FIG. 27, on substantially the opposite side of the rotation ring tab 1810 is a cavity 2704 for holding the internal rotation ring lock 2702. The internal rotation ring lock 2702 is dimensioned to fit in a cavity 2704 of the rotation ring 1812. This cavity 2704 comprises a mechanism to displace the internal rotation ring lock 2702. When the connector is not attached to the receptacle 302, the internal rotation ring lock 2702 is in the first position and extends away from the rotation ring 1812. When in the first position, the internal plug rotate lock 2702 will be partially disposed within the internal plug rotate lock cavity 2704 and prevents the rotation of the rotation ring 1812. When the connector is installed, the internal plug rotate lock 2702 enters the second position and is substantially disposed within the internal plug rotate lock cavity 2704, thereby allowing the rotation ring 1812 to rotate.

The cam electrical panel module 1822 further comprises a tab cam interlock 1814. The tab cam interlock 1814 comprises a ring 1846 and a tab cam interlock quarter circular component 1844 capable of interfacing with the rotation ring 1812. The rotation of the tab cam interlock 1814 is controlled by the rotation of the rotation ring 1812. The tab cam interlock quarter circular component 1844 comprises a rotation ring tab aperture 1848. The rotation ring tab aperture 1848 corresponds to the location or the rotation ring tab 1810, making the tab cam interlock 1814 move in response to the rotation ring 1812. Referring to FIG. 22, the tab cam interlock quarter circular component 1844 further includes a tooth edge 1850 that comprises teeth 2202 at the outer surface of the tooth edge 1850.

Figure 20:
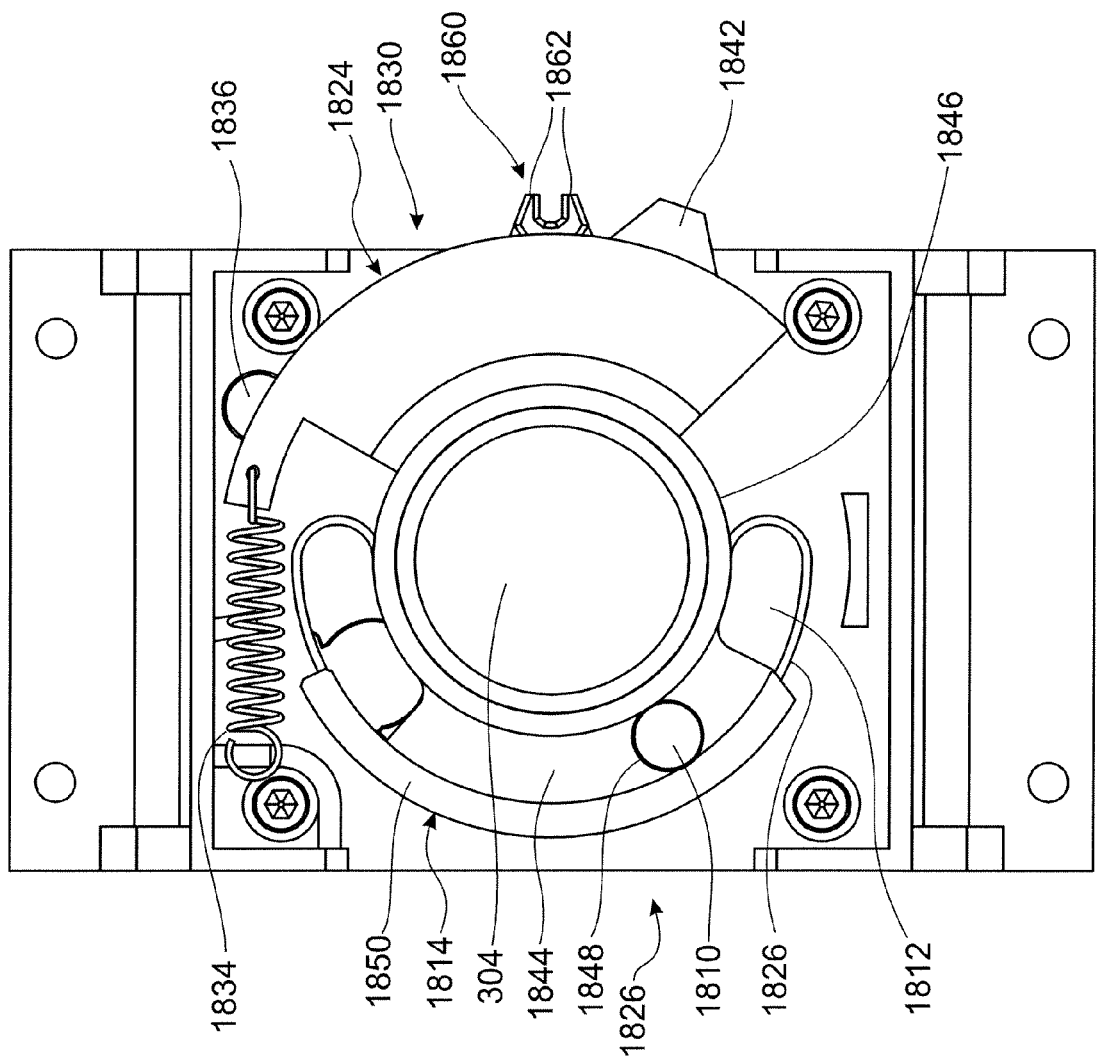
FIG. 20 is a perspective view of the cam electrical module of FIG. 19 where both the cover cam interlock and the tab cam interlock are in the second position according to an exemplary embodiment.
Figure 25:
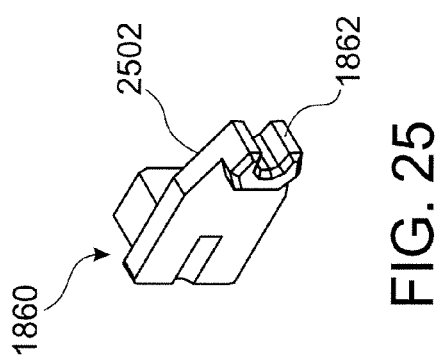
FIG. 25 is an angular perspective view of the external rotation ring lock of FIG. 19 according to an exemplary embodiment.

FIG. 20 is a perspective view of the cam electrical module 1822 of FIG. 19 where both the cover cam interlock 1824 and the tab cam interlock 1814 are in the second position according to an exemplary embodiment. The cam electrical module 1822 is shown as it would be when a connector has been installed, with the cover cam interlock 1824 in the second position and the tab cam interlock 1814 in the second position. Due to the movement of the projection 1842, an external plug rotation ring lock 1860 is visible. The external plug rotation ring lock 1860 comprises external plug rotate lock teeth 1862 that correspond to the teeth 2202 in the tab cam interlock 1814. Referring to FIG. 25, the external plug rotation ring lock 1860 also comprises a surface 2502 that may be acted on by the internal rotation ring lock 2702. The external plug rotating ring lock 1860 alternates between a first position and a second position. When the external plug rotation lock 1860 is in first position, it lies in a plane that is different from the plane occupied by the teeth 2202 of a tab cam interlock 1814. When the rotation ring 1812 acts on the internal rotation ring lock 2702, the internal rotation ring lock 2702 exerts a force on the external plug rotation ring lock 1860, moving the external plug rotation ring lock 1860 into the second position that corresponds to the plane occupied by the teeth 2202 of the tab cam interlock 1814. The external plug rotate lock teeth 1862 from the external plug rotation ring lock 1860 and the tab cam interlock 1814 mesh together when the plug rotation ring lock 1860 is engaged. The interface between the external plug rotate lock 1860 and the tab cam interlock 1814 allows the rotation ring 1812 to be locked in the second position when the external plug rotate lock 1860 is engaged.

Figure 21:
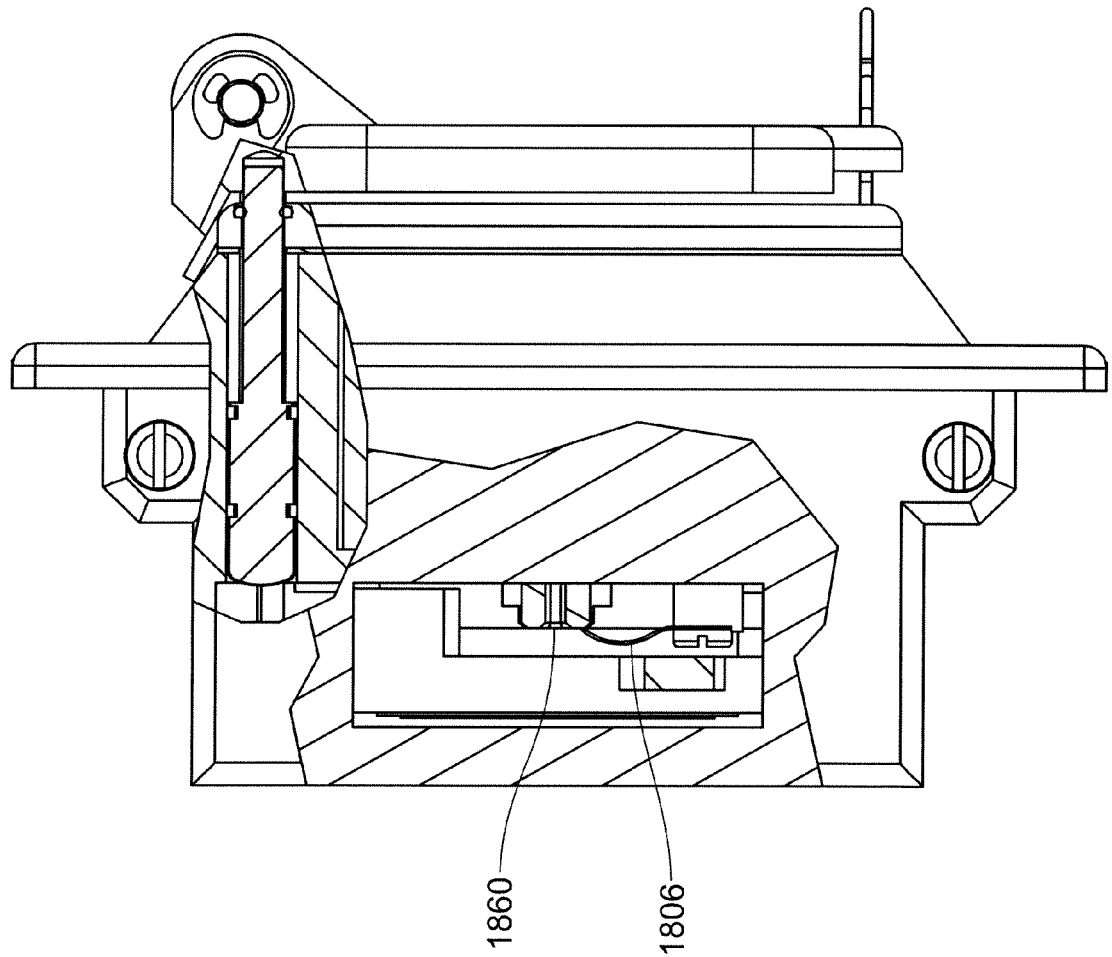
FIG. 21 is a side perspective view of an external rotation ring lock attached to the spring when in the first position according to an exemplary embodiment.

FIG. 21 is a top view of the external plug rotation ring lock 1860 attached to a hold down spring 1806 when in the first position according to an exemplary embodiment. The external plug rotation ring lock 1860 as shown in FIG. 21 is held in the first position by a hold down spring 1806. The biasing force of the hold down spring 1806 pushes the external plug rotation ring lock 1860 towards the cover 306. When a connector is inserted into the receptacle 302, the biasing force of the hold down spring 1806 is overcome and the external plug rotation ring lock 1860 is moved into the second position away from the cover 306.

Figure 28:
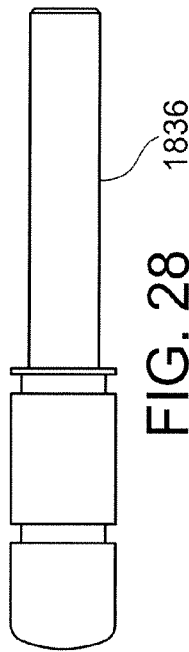
FIG. 28 is a side elevation view of the cover lock pin according to an exemplary embodiment.
Figure 26:
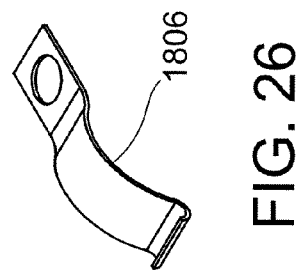
FIG. 26 is an angular perspective view of the external rotation ring lock spring according to an exemplary embodiment of FIG. 19 according to an exemplary embodiment.

FIGS. 22-28 illustrate various individual elements of the cam electrical panel modules 1822 components discussed in the previous paragraphs. FIG. 22 is an angular perspective view of the tab cam interlock 1814 of FIG. 19 according to an exemplary embodiment. FIG. 23 is an angular perspective view of the cover cam interlock 1824 of FIG. 19 according to an exemplary embodiment. FIG. 24 is an angular perspective view of a spacer 2402 of FIG. 19 according to an exemplary embodiment. The spacer 2402 is used to fill the space between the cover cam interlock 1824 and other sections of the cam electrical panel module 1822. FIG. 25 is an angular perspective view of the external plug rotation ring lock 1860. FIG. 26 is an angular perspective view of the external rotation ring lock spring 1806 of FIG. 19 according to an exemplary embodiment. FIG. 27 is an angular perspective view of the rotation ring 1812 in the exemplary embodiment of FIG. 19 according to an exemplary embodiment. FIG. 28 is a side elevation view of the cover lock pin 1836. In the exemplary embodiment, the first end is designed to interface with the cover 306 and the second end is designed to interface with the tapered surface 2302 of the tab cam interlock 1814.

Based on the previous descriptions of the various elements of the cam electrical panel modules 1822, the following exemplary embodiment illustrates how the multiple cam electrical panel modules 1822 form a cam electrical panel assembly 1800 as previously shown in FIG. 18. Three cam electrical panel modules 1822x-z are assembled to form a cam electrical panel assembly 1800. Side plates 1870x, 1870z are attached to the leading edge of cam electrical panel module 1822x and the trailing edge of cam electrical panel module 1822z, respectively. The side plate 1870x attached to cam electrical panel module 1822x comprises a cam ground notch that is substantially similar to the previously described ground notch 906 and mimics a tab cam interlock 1824 of a preceding module in the second position, thereby holding cover cam interlock 1824x in the second position and allowing the cover lock pin 1836 to withdraw from the cover 306x.

Cam electrical panel module 1822x has the cover cam interlock 1824x in the second position. Rotation of the cover cam interlock 1824x causes the tapered surface 2302x of the cover cam interlock 1824x to allow the biasing device acting on the cover lock pin 1836x to withdraw the cover lock pin 1836x from the cover 306x. The cover 306x may be opened, and a connector may be inserted into the receptacle 302x, applying a lateral force on the rotation ring 1812x. The lateral force moves rotation ring 1812x in a direction of the internal rotation ring lock 2702x. The rotation ring 1812x, internal rotation ring lock 2702x, and external plug rotation ring lock 1860x are adjacent to each other in such a manner that when the rotation ring 1812x moves in a lateral direction, the space between the rotation ring 1812x, internal rotation ring lock 2702x, and external plug rotation ring lock 1860x contact each other. As a result of this relationship, when the connector is completely inserted, the connector forces the internal rotation ring lock 2702x to press against the external plug rotation ring lock 1860x. The result is that external plug rotation ring lock 1860x is moved to the second position. Additionally, the internal rotation ring lock 2702x is in the second position, which corresponds to becoming substantially housed in the internal plug rotate lock into the cavity 2702x of the rotation ring 1812x.

With the internal rotation ring lock 2702x in the second position, the rotation ring 1812x is now freely rotatable. When rotated, the connector applies a rotational force to move the rotation ring 1812x into a second position. The second position is reached when the transmitting contacts of the module are in contact with the receiving contacts of the connector. Alternatively, the contacts be contact each other prior to fully reaching the second position. The tab cam interlock 1814x rotates with the rotation ring 1812x due to the action of the rotation ring tab 1810x through the rotation ring channel 1826x that is operably coupled to the tab cam interlock 1814x via the rotation ring tab aperture 1848x. In an exemplary embodiment, the configuration of the tab cam interlock teeth 2202 are designed to correspond with the location where the transmitting and receiving contacts are operably coupled.

The installation of the connector in cam electrical panel module 1822x affects cam electrical panel module 1822y. The projection 1842y from the cover cam interlock 1824y of cam electrical panel module 1822y extends into cam electrical panel module 1822x via the cover cam interlock aperture 1830y of cam electrical panel module 1822y and the tab cam interlock aperture 1828x of cam electrical panel module 1822x. When the tab cam interlock 1814x of cam electrical panel module 1822x reaches the second position, the tab cam interlock 1814x of cam electrical panel module 1822x displaces the cover cam interlock 1824y of cam electrical panel module 1822y, thereby rotating the cover cam interlock 1824y of cam electrical panel module 1822y into the second position.

With the cover cam interlock 1824y of cam electrical panel module 1822y in the second position, the tapered surface 2302y of the tab cam interlock 1814y allows the biasing device acting on the cover lock pin 1836y to withdraw the cover lock pin 1836y from the cover 306y. The cover 306y may be opened and a connector may be inserted into the receptacle 302y. The connector applies a lateral force on rotation ring 1812y. The lateral force moves rotation ring 1812y in a direction of internal rotation ring lock 2702y. The rotation ring 1812y, internal rotation ring lock 2702y, and external plug rotation ring lock 1860y are adjacent to each other in such a manner that when the rotation ring 1812y moves in a lateral direction, the space between the rotation ring 1812y, internal rotation ring lock 2702y, and external plug rotation ring lock 1860y contact each other. As a result of this relationship, when the connector is completely inserted, the connector forces the internal rotation ring lock 2702y to press against the external plug rotation ring lock 1860y. The result is that external plug rotation ring lock 1860y is moved to the second position. Additionally, the internal rotation ring lock 2702y is in the second position, which corresponds to becoming substantially housed in With the external plug rotation ring lock 1860y in the second position, the external plug rotate lock teeth 1862y of the external plug rotation ring lock 1860y now interact with the tab cam interlock teeth 2202x of the cover cam interlock 1824x of cam electrical panel module 1822x. With the external plug rotate lock teeth 1862y of the external plug rotation ring lock 1860y unable to rotate, the tab cam interlock 1814x of cam electrical panel module 1822x is fixed in position, preventing the rotation ring 1812x of cam electrical panel module 1822x from rotating to release the connector. This feature allows cam electrical panel module 1822y to fix the connectors of cam electrical panel module 1822x in position, regardless of the actual position of the connector in the cam electrical panel module 1822x.

With the internal rotation ring lock 2702y of cam electrical panel module 1822y in the second position, the rotation ring 1812y is freely rotatable. When rotated, the connector applies a rotational force to move the rotation ring 1812y into a second position. The second position is reached when the transmitting contacts of the cam electrical panel module 1822y are in contact with the receiving contacts of the connector. Alternatively, the contacts be contact each other prior to fully reaching the second position. The tab cam interlock 1814y rotates with the rotation ring 1812y due to the action of the rotation ring tab 1810y through the rotation ring channel 1826y that is operably coupled to the tab cam interlock 1814y via the rotation ring tab aperture 1848y.

The installation of the connector in cam electrical panel module 1822y affects cam electrical panel module 1822z. The cover cam interlock projection 1842z extends into cam electrical panel module 1822y via the tab cam interlock aperture 1828z of cam electrical panel module 1822z and the cover cam interlock aperture 1830y of cam electrical panel module 1822y. When the tab cam interlock 1814y of cam electrical panel module 1822y reaches the second position, the tab cam interlock 1814y of cam electrical panel module 1822y displaces the cover cam interlock 1824z of cam electrical panel module 1822z, rotating the cover cam interlock 1824z of cam electrical panel module 1822z into the second position.

With the cover cam interlock 1824z of cam electrical panel module 1822z in the second position, the tapered surface 2302z of the cover cam interlock 1824z allows the biasing device acting on the cover lock pin 1836z to withdraw the cover lock pin 1836z from the cover 306z. The cover 306z may be opened and a connector may be inserted into the receptacle 302z. The connector applies a lateral force on rotation ring 1812z. The lateral force moves the rotation ring 1812z in a direction of internal rotation ring lock 2702z. When completely inserted, the connector forces the internal rotation ring lock 2702z to press against external plug rotation ring lock 1860z. The result is that the internal rotation ring lock 2702z is in the second position, which corresponds to becoming substantially housed in the internal plug rotate lock cavity 2704z of the rotation ring 1812z. Additionally, the external plug rotation ring lock 1860z is now in a second position.

With the external rotation ring lock 1860z in the second position, the external plug rotate lock teeth 1862z of the external plug rotation ring lock 1860z now interact with the tab cam interlock teeth 2202y of the tab cam interlock 1814y of cam electrical panel module 1822y. With the external plug rotate lock teeth 1862z of the external plug rotation ring lock 1860z unable to rotate, the tab cam interlock 1814y of cam electrical panel module 1822y is fixed in position, preventing the rotation ring 1812y of cam electrical panel module 1822y from rotating to release the connector. This feature allows the cam electrical panel module 1822z to fix the connectors of the cam electrical panel module 1822y in position, regardless of the actual position of the connector in cam electrical panel module 1822y.

To disconnect connectors from the modules, the connectors are decoupled from receptacles 302 in reverse order. In the exemplary embodiment, the tab cam interlock 1814z of cam electrical panel module 1822z is not fixed in position, allowing the rotation ring 1812z to freely rotate. The connector is rotated, causing the rotation ring 1812z to return to the first position where the connector is removed. When the connector is removed from cam electrical panel module 1822z, the lateral force acting on the rotation ring 1812z is removed, causing the external plug rotation ring lock 1860z and internal rotation ring lock 2702z to return to the first position. With internal rotation ring lock 2702z in the first position, the rotation ring 1812z is locked in the first position. With the external plug rotation ring lock 1860z in the first position, the external plug rotate lock teeth 1862z of external plug rotation ring lock 1860z are disengaged from the tab cam interlock 1814y of cam electrical panel module 1822y.

With the release of the external rotation ring lock teeth 1862z from the tab cam interlock 1814y from cam electrical panel module 1822y, the rotation ring 1812y is freely rotatable. The connector is rotated, causing the rotation ring 1812y to return to the first position where the connector is removed. Additionally, the return of the rotation ring 1812y to the first position causes the tab cam interlock 1814y to move to the first position. With the tab cam interlock 1814y of cam electrical panel module 1822y in the first position, the tab cam interlock 1814y no longer acts on the cover cam interlock 1824z of cam electrical panel module 1822z. The cover cam interlock 1824z of cam electrical panel module 1822z returns to the first position where the tapered surface 2302z of the cover cam interlock 1824z acts on the cover lock pin 1836z to overcome the biasing device. With the biasing force overcome, the cover lock pin 1836z enters the cover 306z, preventing the cover 306z from being opened.

When the connector is removed from cam electrical panel module 1822y, the lateral force acting on the rotation ring 1812y is removed, causing the external plug rotation ring lock 1860y and internal rotation ring lock 2702y to return to the first position. With internal rotation ring lock 2702y in the first position, the rotation ring 1812y is locked in the first position. With the external plug rotation ring lock 1860y in the first position, the external plug rotate lock teeth 1862y of external plug rotation ring lock 1860y are disengaged from the tab cam interlock 1814x of cam electrical panel module 1822x.

With the release of the external rotation ring lock teeth 1862y from the tab cam interlock 1814x from cam electrical panel module 1822x, the rotation ring 1812x is freely rotatable. The connector is rotated, causing the rotation ring 1812x to return to the first position where the connector is removed. Additionally, the return of the rotation ring 1812x to the first position causes the tab cam interlock 1814x to move to the first position. With the tab cam interlock 1814x of cam electrical panel module 1822x in the first position, the tab cam interlock 1814x no longer acts on the cover cam interlock 1824y of cam electrical panel module 1822y. The cover cam interlock 1824y of cam electrical panel module 1822y returns to the first position where the tapered surface 2302y of the cover cam interlock 1824y acts on the cover lock pin 1836y to overcome the biasing device. With the biasing force overcome, the cover lock pin 1836y enters the cover 306y, preventing the cover 306y from being opened.

When the connector is removed from cam electrical panel module 1822x, the lateral force acting on the rotation ring 1812x is removed, causing the external plug rotation ring lock 1860x and internal rotation ring lock 2702x to return to the first position. With internal rotation ring lock 2702x in the first position, the rotation ring 1812x is locked in the first position.

Due to the use of the side plate, the cover cam interlock 1824x remains in the second position. As a result, the cover lock pin 1836x does not enter the cover 306x, allowing the cover 306x to be opened and a connector to be inserted.

Figure 29:
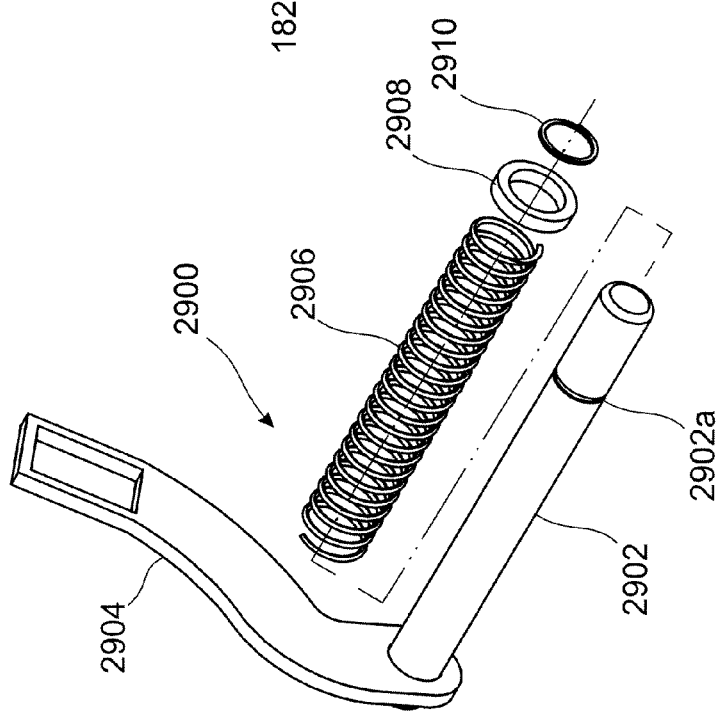
FIG. 29 is an angular perspective view of a modified cover lock pin according to an exemplary embodiment.

FIG. 29 is an angular perspective view of a modified cover lock pin 2900 according to an exemplary embodiment. The modified cover lock pin 2900 accomplishes substantially the same function as the previously-described cover lock pin 1836 except as follows: An alternative embodiment of the cam electrical panel module 1822 uses the modified cover lock pin 2900 to interact with the external plug rotation ring lock 1860 to fix a connector in a previous cam electrical panel module 1822. The modified cover lock pin 2900 comprises a pin 2902 and a lift plate 2904 coupled to one end of the pin 2902. A spring 2906 is disposed around the pin 2902. A plate washer 2908 holds the spring 2906 in position, and the ring member 2910 is disposed in a groove 2902a of the pin 2902 to hold the spring 2906 and the plate washer 2908 in position on the pin 2902.

Figure 30:
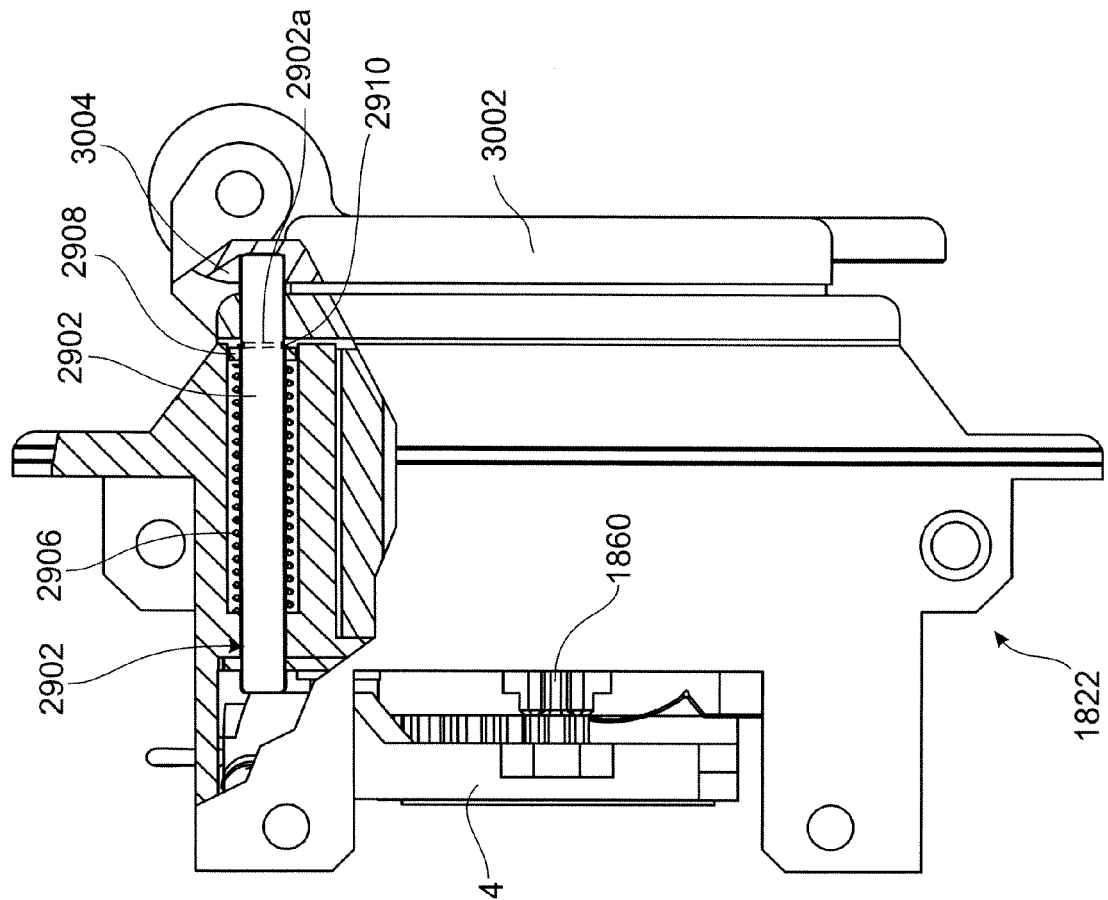
FIG. 30 is a side perspective view of a cam electrical panel module with a modified cover in a closed position according to an exemplary embodiment.

FIG. 30 is a side perspective view of a cam electrical panel module 1822 utilizing the lock pin 2900 and having a modified cover 3002 in a closed position according to an exemplary embodiment. The lock pin 2900 is disposed within a bore 3006 of the module 1822. In first position, the lock pin 2900 is biased to rest as shown in FIG. 30, with the pin 2902 engaged with the modified cover 3002. When the cover cam interlock 1824 is in first position, the lock pin 2900 is in first position, the concave portion 2304 of the cover cam interlock 1824 prevents movement of the pin 2902 into the module 1822, and the cover 3002 is closed. Additionally, the lift plate 2904 is disposed adjacent to the external plug rotation ring lock 1860.

The lock pin 2900 is biased to project into the modified cover 3002. The modified cover 3002 compromises a tapered surface 3004 that is dimensioned to accept the lock pin 2900 while still allowing the modified cover 3002 to open. When the modified cover 3002 is closed, the modified cover lock pin 2900 projects into the modified cover 3002 via the biasing force of the spring 2906, thereby keeping the modified cover lock pin in first position.

FIG. 31 is a side perspective view of a cam electrical panel module 1822 with the modified cover 3002 in an open position according to an exemplary embodiment. As shown in FIG. 31 the cover cam interlock 1824 has been moved to second position by insertion of a connector (not shown) into a preceding module (not shown). Moving the cover cam interlock 1824 to second position causes the concave portion 2304 of the cover cam interlock 1824 to be disposed adjacent to the pin 2902, thereby allowing movement of the pin 2902 into the module 1822. As the cover 3002 is opened, the tapered portion 3004 of the cover 3002 (and then an external, circular portion of the cover) acts on the pin 2902 to push the pin 2902 against the bias force of the spring 2906 and into the module 1822. Accordingly, the lock pin 2900 is illustrated in second position in FIG. 31. As the lock pin 2900 moves to second position, the lift plate 2904 now acts on the external plug rotation ring lock 1860, moving the external plug rotation ring lock 1860 into second position. As previously discussed, with the external plug rotation ring lock 1860 of a module 1822 in second position, the external plug rotation ring lock teeth 1862 act on the tab cam interlock teeth 2202 of the preceding module, thereby fixing the tab cam interlock 1814 of the preceding module in position. The lift plate 2904 will continue to act on the external plug rotation ring lock 1860 until the modified cover lock pin 2900 returns to first position, which can only occur when the cover 3002 is closed. As a result, a connector cannot be removed from a proceeding module if the subsequent module 1822 in series still has the cover 3002 open.

An additional feature involves the use of alternative tongue and seal grooves using a tongue with a tapered lead in a groove with a square bottom. A filling tube similar to an O ring fits between the tongue and groove and conforms to that square when the modules are assembled.

Therefore, the present disclosed apparatus is well adapted to attain the ends and advantages mentioned as well as those that are inherent therein. The particular embodiments disclosed above are illustrative only, as the presently disclosed apparatus may be modified and practiced in different but equivalent manners apparent to those having ordinary skill in the art and having the benefit of the teachings herein. Having described some exemplary embodiments of the presently disclosed apparatus, it is believed that various modifications are within the purview of those in the art without departing from the scope and spirit of the invention. While numerous changes may be made by those having ordinary skill in the art, such changes are encompassed within the spirit of the disclosed apparatus as defined by the appended claims. Furthermore, no limitations are intended to the details of construction or design herein shown, other than as described in the claims below. It is therefore evident that the particular exemplary embodiments disclosed above may be altered or modified and all such variations are considered within the scope and spirit of the present disclosed apparatus. The terms in the claims have their plain, ordinary meaning unless otherwise explicitly and clearly defined by the patentee.

What is claimed is:

1. An electrical panel assembly, comprising:
   a first electrical panel module comprising:
      a first receptacle;
      a first rotation ring that is rotatable between an open position permitting connection or disconnection of a first connector from said first receptacle and a closed position preventing connection or disconnection of the first connector from said first receptacle;
      a first module tab cam interlock operably coupled to said first rotation ring and rotatable between a first position when the rotation ring is in the open position and a second position when the rotation ring is in the closed position; and
      a first module tab cam interlock aperture,
      wherein said first module tab cam interlock in the second position is located adjacent to said first module tab cam interlock aperture,
      wherein said first electrical panel module interacts with a second electrical panel module in a manner such that the absence of the first connector in said first receptacle prevents said second electrical panel module from accepting a second connector.

2. The electrical panel assembly of claim 1, wherein the closed position of said first rotation ring is based on a position wherein at least one contact of said receptacle is coupled to at least one contact of the connector.

3. The electrical panel assembly of claim 1, further comprising a limit switch affixed to an external casing of said electrical panel module.

4. The electrical panel assembly of claim 1, further comprising a tongue in groove seal,
   wherein said electrical panel module comprises a tapered tongue combined with a second electrical panel module with a square groove, and
   wherein the tongue and groove are operably coupled.

5. The electrical panel assembly of claim 1, further comprising a casing to provide independent structural support to said electrical panel module, said casing comprising an openable cover that provides access to a rear of said electrical panel module.

6. The electrical panel assembly of claim 1, wherein said first electrical panel module further comprises:
   a first cover covering said first receptacle;
   a first cover lock pin that operates between a first position that allows said first cover to open and a second position that prevents said first cover from opening; and
   a first biasing device acting on said first cover lock pin to maintain said first cover lock pin in one of the first and second positions.

7. The electrical panel assembly of claim 6, wherein said first electrical panel module further comprises a first module cover cam interlock operably rotatable between a first position that forces the first cover lock pin in its second position and a second position where the first cover lock pin enters its first position.

8. The electrical panel assembly of claim 7, wherein the first module cover cam interlock comprises a first tapered surface that acts on said first cover lock pin depending on the position of said first module cover cam interlock.

9. The electrical panel assembly of claim 7, further comprising a side plate, wherein said side plate fixes said first module cover cam interlock is in the second position.

10. The electrical panel assembly of claim 1, further comprising said second electrical panel module, wherein said second electrical panel module comprises:
    a second receptacle;
    a second rotation ring that is rotatable between an open position permitting connection or disconnection of a second connector from said second receptacle and a closed position preventing connection or disconnection of the second connector from said second receptacle;
    a second module cover cam interlock operably rotatable between a first position when said first module tab cam interlock is in its first position and a second position when said first module tab cam interlock is in its second position;
    a second module cover cam interlock aperture; and
    a second external rotation ring lock operably movable between a first position and a second position when the second connector is installed in the second receptacle, wherein the second external rotation ring lock acts on the first module tab cam interlock, thereby fixing the first module tab cam interlock in its second position until the second connector is removed.

11. The electrical panel assembly of claim 10, wherein the closed position of said second rotation ring is based on a position wherein at least one contact of said second receptacle is coupled to at least one contact of the second connector.

12. The electrical panel assembly of claim 10, wherein said second electrical panel module further comprises:
    a second module tab cam interlock operably rotatable between a first position when the second rotation ring is in the open position and a second position when the second rotation ring is in the closed position; and
a second module tab cam interlock aperture,
wherein said second module tab cam interlock in its second position is located adjacent to said second module tab cam interlock aperture.

13. The electrical panel assembly of claim 10, wherein said second electrical panel module further comprises:
a second cover covering said second receptacle;
a second cover lock pin that operates between a first position that allows the second cover to open and a second position that prevents the second cover from opening; and
a second biasing device acting on said second cover lock pin to maintain said second cover lock pin in one of its first or second positions.

14. The electrical panel assembly of claim 13, wherein said second electrical panel module further comprises a second module cover cam interlock operably rotatable between a first position that forces the second cover lock into is second position and a second position where said second cover lock pin enters its first position.

15. The electrical panel assembly of claim 14, wherein the second module cover cam interlock comprises a second tapered surface that acts on said second cover lock pin depending on the position of said second module cover cam interlock.

16. The electrical panel assembly of claim 10, wherein said second electrical panel module interacts with a third electrical panel module in a manner such that the absence of the second connector in said second receptacle prevents said third electrical panel module from accepting a third connector.

17. The electrical panel assembly of claim 16, further comprising said third electrical panel module, wherein said third electrical panel module comprises:
a third receptacle;
a third rotation ring that is rotatable between an open position permitting connection or disconnection of a third connector from said third receptacle and a closed position preventing connection or disconnection of the third connector from said third receptacle and;
a third module cover cam interlock operably rotatable between a first position when said second module tab cam interlock is in its first position and a second position when said second module tab cam interlock is in its second position;
a third module cover cam interlock aperture: and
a third external rotation ring lock operably movable between a first position and a second position when the third connector is installed in said third receptacle, wherein the third external rotation ring lock acts on the second module tab cam interlock, thereby fixing the second module tab cam interlock in its second position until the third connector is removed.

18. An electrical panel assembly of claim 17, wherein said third electrical panel module interacts with a third electrical panel module in a manner that the absence of the third connector in said third receptacle prevents a fourth electrical panel module from accepting a fourth connector.

19. The electrical panel assembly of claim 17, wherein the closed position of the third rotation ring is based on the position where the transmitting electrical contacts and the receiving electrical contacts align.

20. The electrical panel assembly of claim 17, wherein said third electrical panel module further comprises:
a third module tab cam interlock operably rotatable between a first position with the rotation ring is in an open position and a second position when the third rotation ring is in a closed position; and
a third module tab cam interlock aperture,
wherein said third module tab cam interlock in position is located adjacent to said third module tab cam interlock aperture.

21. The electrical panel assembly of claim 17, wherein said first electrical panel module further comprises:
a third cover covering said third receptacle; and
a third cover lock pin that operates between a first position that allows said third cover to open and a second position that prevents said third cover from opening; and
a third biasing device acting on said third cover lock pin to maintain said third cover lock pin first position.

22. The electrical panel assembly of claim 21, wherein said third electrical panel module further comprises a third module cover cam interlock operably rotatable between a first position that obstructs a path for a third module cover lock pin and a second position where the path of the third module cover lock pin is unobstructed.

23. The electrical panel assembly of claim 22, wherein the third module cover cam interlock comprises a third tapered surface that acts on said third cover lock pin depending on the position of said third module cover cam interlock.

24. The electrical panel assembly of claim 22, wherein said third module has an end cap covering said third module tab cam interlock aperture.

25. An electrical panel module, comprising:
a module casing designed to link with subsequent electrical panel modules in series;
a receptacle disposed in said module casing;
a rotation ring that facilitates contact between said receptacle and a connector, wherein said rotation ring is rotatable between an open position permitting connection or disconnection of the connector from said receptacle and a closed position preventing connection or disconnection of the connector from said receptacle;
a tab cam interlock interfacing with a subsequent electrical panel module; and
one or more openings in said casing to facilitate interconnectivity with the subsequent electrical power module via said tab cam interlock.

26. The electrical panel module of claim 25, wherein the closed position of said rotation ring is based on a position wherein at least one contact of said receptacle is coupled to at least one contact of the connector.

27. The electrical panel module of claim 25, further comprising:
a cover cam interlock to interface with a previous electrical panel module; and
one or more openings to facilitate internal interconnectivity with a previous electrical power module via said cover cam interlock,
wherein connection between connector and receptacle acts on said tab cam interlock to move said tab cam interlock to a second position, and
wherein connection between connector and receptacle acts on an external plug rotate lock, fixing a previous electrical power module rotation ring to prevent previous electrical panel module from disconnecting from said connector.

28. An electrical panel assembly, comprising:
a first electrical panel module comprising:
a first receptacle; and
a first locking device that is movable between an unlocked position permitting connection or disconnection of a first connector from said first receptacle and a locked position preventing connection or disconnection of the first connector from said first receptacle, wherein the locked position of said first locking device is based on a position wherein at least one contact of said receptacle is coupled to at least one contact of the connector, and wherein said first electrical panel module interacts with a second electrical panel module in a manner such that the absence of the first connector in said first receptacle prevents said second electrical panel module from accepting a second connector.

29. An electrical panel assembly, comprising:
a first electrical panel module comprising:
   a first receptacle;
   a first rotation ring that is rotatable between an open position permitting connection or disconnection of a first connector from said first receptacle and a closed position preventing connection or disconnection of the first connector from said first receptacle;
   a first cover covering said first receptacle;
   a first cover lock pin that operates between a first position that allows said first cover to open and a second position that prevents said first cover from opening;
   a first biasing device acting on said first cover lock pin to maintain said first cover lock pin in one of the first and second positions; and
   a first module cover cam interlock operably rotatable between a first position that forces the first cover lock pin in its second position and a second position where the first cover lock pin enters its first position,
wherein said first electrical panel module interacts with a second electrical panel module in a manner such that the absence of the first connector in said first receptacle prevents said second electrical panel module from accepting a second connector.

30. The electrical panel assembly of claim 29, wherein the closed position of said first rotation ring is based on a position wherein at least one contact of said receptacle is coupled to at least one contact of the connector.

31. The electrical panel assembly of claim 29, wherein the first module cover cam interlock comprises a first tapered surface that acts on said first cover lock pin depending on the position of said first module cover cam interlock.

32. The electrical panel assembly of claim 29, further comprising a side plate, wherein said side plate fixes said first module cover cam interlock is in the second position.

33. An electrical panel assembly, comprising:
a first electrical panel module comprising:
   a first receptacle;
   a first rotation ring that is rotatable between an open position permitting connection or disconnection of a first connector from said first receptacle and a closed position preventing connection or disconnection of the first connector from said first receptacle; and
   a tongue in groove seal,
   wherein said electrical panel module comprises a tapered tongue combined with a second electrical panel module with a square groove,
   wherein the tongue and groove are operably coupled, and
   wherein said first electrical panel module interacts with said second electrical panel module in a manner such that the absence of the first connector in said first receptacle prevents said second electrical panel module from accepting a second connector.

* * * * *